United States Patent
Fujii et al.

(10) Patent No.: US 9,522,990 B2
(45) Date of Patent: Dec. 20, 2016

(54) CARBON BLACK

(71) Applicant: SUMITOMO CHEMICAL COMPANY, LIMITED, Tokyo (JP)

(72) Inventors: Yohei Fujii, Ichihara (JP); Hiroshi Shiratani, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/438,046

(22) PCT Filed: Oct. 24, 2013

(86) PCT No.: PCT/JP2013/079481
§ 371 (c)(1),
(2) Date: Apr. 23, 2015

(87) PCT Pub. No.: WO2014/065438
PCT Pub. Date: May 1, 2014

(65) Prior Publication Data
US 2015/0291777 A1   Oct. 15, 2015

(30) Foreign Application Priority Data
Oct. 26, 2012  (JP) .................................. 2012-236349

(51) Int. Cl.
C08K 9/04 (2006.01)
B60C 1/00 (2006.01)
C09C 1/56 (2006.01)
C09C 1/48 (2006.01)
B60C 5/00 (2006.01)
B60C 9/00 (2006.01)

(52) U.S. Cl.
CPC . *C08K 9/04* (2013.01); *B60C 1/00* (2013.01); *B60C 1/0016* (2013.04); *B60C 1/0025* (2013.04); *B60C 1/0041* (2013.04); *B60C 5/00* (2013.01); *B60C 9/0007* (2013.04); *C09C 1/48* (2013.01); *C09C 1/56* (2013.01); *B60C 2001/0066* (2013.04); *B60C 2009/0021* (2013.04); *C01P 2004/64* (2013.01); *C01P 2006/12* (2013.01); *C01P 2006/80* (2013.01)

(58) Field of Classification Search
CPC .............. C08K 9/04; C09C 1/56; C09C 1/48; B60C 1/00; B60C 1/0024; B60C 1/0025; B60C 1/0016; B60C 1/0041; B60C 9/0007; B60C 5/00; B60C 2001/0066; B60C 2009/0021; C01P 2006/80; C01P 2004/64; C01P 2006/12
USPC .......... 524/556; 427/510; 428/195.1
See application file for complete search history.

(56) References Cited

U.S. PATENT DOCUMENTS

| 2001/0032569 | A1 | 10/2001 | Bergemann et al. | |
|---|---|---|---|---|
| 2002/0096089 | A1 | 7/2002 | Bergemann et al. | |
| 2005/0031528 | A1 | 2/2005 | Niedermeier et al. | |
| 2006/0247342 | A1* | 11/2006 | Da Silva ................... | B60C 1/00 524/105 |
| 2010/0269732 | A1 | 10/2010 | Sekiyama | |
| 2012/0088928 | A1* | 4/2012 | Ozturk ..................... | C08K 5/42 560/309 |
| 2012/0101219 | A1* | 4/2012 | Ozturk ..................... | B60C 1/00 524/575.5 |

FOREIGN PATENT DOCUMENTS

| EP | 2 439 237 A1 | 4/2012 |
|---|---|---|
| EP | 2 450 402 A1 | 5/2012 |
| JP | 52-130481 A | 11/1977 |
| JP | 54-20478 B2 | 7/1979 |
| JP | 62-273267 A | 11/1987 |
| JP | 63-83171 A | 4/1988 |
| JP | 64-056670 A | 3/1989 |
| JP | 11-256067 A | 9/1999 |
| JP | 2001-323185 A | 11/2001 |
| JP | 2004-285140 A | 10/2004 |
| JP | 2004-346219 A | 12/2004 |
| JP | 2006-234926 A | 9/2006 |
| JP | 2007-505957 A | 3/2007 |
| JP | 2009-132848 A | 6/2009 |
| JP | 2012-126923 A | 7/2012 |
| JP | 2012-144597 A | 8/2012 |
| JP | 2012-144598 A | 8/2012 |
| JP | 2012-144601 A | 8/2012 |
| JP | 2012-181190 A | 9/2012 |
| JP | 2012-251088 A | 12/2012 |
| JP | 2013-049811 A | 3/2013 |
| JP | 2013-119614 A | 6/2013 |
| JP | 2013-119615 A | 6/2013 |
| WO | 02/098991 A1 | 12/2002 |
| WO | 2009/084714 A1 | 7/2009 |
| WO | 2010/140704 A1 | 12/2010 |
| WO | 2011/001990 A1 | 1/2011 |

OTHER PUBLICATIONS

International Search Report dated Jan. 24, 2014 issued in application No. PCT/JP2013/079481.
International Preliminary Report on Patentability issued in application No. PCT/JP2013/079481 dated May 7, 2015.
Introductory Rubber Technology, Maruzen Co., Ltd. Compiled by the Society of Rubber Science and Technology, Japan, p. 124, 2004.
Communication, dated Jun. 14, 2016, from the European Patent Office in counterpart European application No. 13848228.6.

* cited by examiner

*Primary Examiner* — Michael M Bernshteyn
(74) *Attorney, Agent, or Firm* — Sughrue Mion, PLLC

(57) ABSTRACT

A modified carbon black comprising carbon black and at least one compound selected from the group consisting of a compound represented by formula (I) and a compound represented by formula (II), in which the content of the at least one compound selected from the group consisting of a compound represented by formula (I) and a compound represented by formula (II) relative to 100 parts by weight of carbon black is 0.1 to 50 parts by weight.

14 Claims, No Drawings

CARBON BLACK

CROSS REFERENCE TO RELATED APPLICATIONS

This application is a National Stage of International Application No. PCT/JP2013/079481 filed Oct. 24, 2013, claiming priority based on Japanese Patent Application No. 2012-236349 filed Oct. 26, 2012, the contents of all of which are incorporated herein by reference in their entirety.

TECHNICAL FIELD

The present invention relates to carbon black and others.

BACKGROUND ART

Recently, improvement of fuel efficiency (i.e., low fuel consumption) of automobiles has been required upon request from environment protection. In the field of automobile tire, it is known that fuel efficiency of automobiles is improved by improving the viscoelasticity of vulcanized rubber for use in production of tires (see, Non Patent Literature 1).

In Patent Literature 1, it is disclosed that a compound represented by formula (I-1) is effective for improving the viscoelasticity of vulcanized rubber.

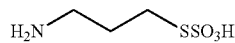
(I-1)

CITATION LIST

Patent Literature

Patent Literature 1: Japanese Patent Application Laid-Open No. 2012-126923

Non Patent Literature

Non Patent Literature 1: "Introductory Rubber Technology" edited by the Society of Rubber Industry, Japan, MARUZEN Co., Ltd., page 124

SUMMARY OF INVENTION

Technical Problem

However, it has been desired to further improve the viscoelasticity of vulcanized rubber. An object of the present invention is to provide a modified carbon black further improving the viscoelasticity of vulcanized rubber, a method for producing the modified carbon black and others.

Solution to Problem

The present invention comprises the following inventions.

[1] A modified carbon black comprising carbon black and at least one compound selected from the group consisting of a compound represented by formula (I) and a compound represented by formula (II), in which a content of the at least one compound selected from the group consisting of a compound represented by formula (I) and a compound represented by formula (II) relative to 100 parts by weight of carbon black is 0.1 to 50 parts by weight:

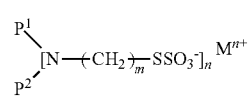
(I)

wherein $P^1$ and $P^2$ each independently represent a hydrogen atom or an alkyl group having 1 to 6 carbon atoms, or $P^1$ and $P^2$ are combined with each other to represent an alkanediyl group having 2 to 6 carbon atoms;
  m represents an integer of 2 to 9;
  $M^{n+}$ represents $H^+$ or an n-valent metal cation; and
  n represents an integer of 1 to 3,

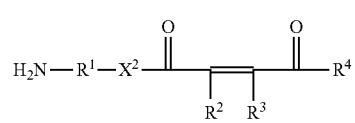
(II)

wherein $R^1$ represents an alkanediyl group having 1 to 12 carbon atoms and optionally having a substituent, a cycloalkanediyl group having 3 to 12 carbon atoms and optionally having a substituent or a *—$B^1$—Ar—$B^2$—* group wherein * represents a bond,
  $B^1$ represents a single bond or an alkanediyl group having 1 to 12 carbon atoms,
  $B^2$ represents a single bond or an alkanediyl group having 1 to 12 carbon atoms, and
  Ar represents a divalent aromatic hydrocarbon group having 6 to 12 carbon atoms and optionally having a substituent;
  $R^2$ and $R^3$ each independently represent a hydrogen atom, a halogen atom, an alkyl group having 1 to 6 carbon atoms, an aryl group having 6 to 12 carbon atoms, a hydroxy group or an alkoxy group having 1 to 6 carbon atoms, or $R^2$ and $R^3$ are combined with each other to represent an alkanediyl group having 2 to 12 carbon atoms;
  $R^4$ represents a hydroxy group, an alkoxy group having 1 to 6 carbon atoms, an aryloxy group having 6 to 12 carbon atoms, an arylalkoxy group having 7 to 15 carbon atoms, an amino group having 0 to 12 carbon atoms or —$O^-(Y^{n+})^{1/n}$ wherein $Y^{n+}$ represents an n-valent cation and n represents 1 or 2; and
  $X^2$ represents —NH— or —O—.

[2] The modified carbon black according to [1], in which the at least one compound selected from the group consisting of a compound represented by formula (I) and a compound represented by formula (II) is a compound represented by formula (I), a nitrogen-element content is 0.01 to 10 wt % and a sulfur-element content is 0.04 to 13.5 wt %.

[3] The modified carbon black according to [1] or [2], obtained by mixing carbon black and at least one compound selected from the group consisting of a compound represented by formula (I) and a compound represented by formula (II).

[4] The modified carbon black according to any one of [1] to [3], obtained by mixing carbon black and at least one compound selected from the group consisting of a compound represented by formula (I) and a compound represented by formula (II) in the presence of a solvent and taking out a solid substance from the obtained mixture.

[5] The modified carbon black according to [4], in which the solvent is water.

[6] The modified carbon black according to any one of [1] to [5], in which the at least one compound selected from the group consisting of a compound represented by formula (I) and a compound represented by formula (II) is a compound represented by formula (I-1):

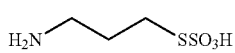

(I-1)

[7] The modified carbon black according to any one of [1] to [6], wherein the modified carbon black is in a granular form.

[8] The modified carbon black according to any one of [1] to [7], obtained by mixing carbon black and an aqueous solution of at least one compound selected from the group consisting of a compound represented by formula (I) and a compound represented by formula (II), and granulating followed by drying.

[9] The modified carbon black according to any one of [1] to [7], obtained by mixing carbon black and water, granulating, thereafter adding an aqueous solution of at least one compound selected from the group consisting of a compound represented by formula (I) and a compound represented by formula (II) and drying.

[10] A method for producing a modified carbon black comprising mixing carbon black and at least one compound selected from the group consisting of a compound represented by formula (I) and a compound represented by formula (II):

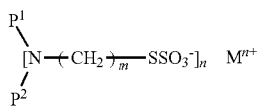

(I)

wherein $P^1$ and $P^2$ each independently represent a hydrogen atom or an alkyl group having 1 to 6 carbon atoms, or $P^1$ and $P^2$ are combined with each other to represent an alkanediyl group having 2 to 6 carbon atoms;

m represents an integer of 2 to 9;

$M^{n+}$ represents $H^+$ or an n-valent metal cation; and n represents an integer of 1 to 3,

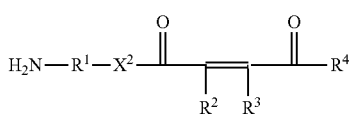

(II)

wherein $R^1$ represents an alkanediyl group having 1 to 12 carbon atoms and optionally having a substituent, a cycloalkanediyl group having 3 to 12 carbon atoms and optionally having a substituent or a *—$B^1$—Ar—$B^2$— group wherein * represents a bond, $B^1$ represents a single bond or an alkanediyl group having 1 to 12 carbon atoms, $B^2$ represents a single bond or an alkanediyl group having 1 to 12 carbon atoms, and Ar represents a divalent aromatic hydrocarbon group having 6 to 12 carbon atoms and optionally having a substituent;

$R^2$ and $R^3$ each independently represent a hydrogen atom, a halogen atom, an alkyl group having 1 to 6 carbon atoms, an aryl group having 6 to 12 carbon atoms, a hydroxy group or an alkoxy group having 1 to 6 carbon atoms, or $R^2$ and $R^3$ are combined with each other to represent an alkanediyl group having 2 to 12 carbon atoms;

$R^4$ represents a hydroxy group, an alkoxy group having 1 to 6 carbon atoms, an aryloxy group having 6 to 12 carbon atoms, an arylalkoxy group having 7 to 15 carbon atoms, an amino group having 0 to 12 carbon atoms or —$O^-(Y^{n+})^{1/n}$ wherein $Y^{n+}$ represents an n-valent cation and n represents 1 or 2; and $X^2$ represents —NH— or —O—.

[11] The method for producing a modified carbon black according to [10], comprising mixing carbon black and at least one compound selected from the group consisting of a compound represented by formula (I) and a compound represented by formula (II) in the presence of a solvent and taking out a solid substance from the obtained mixture.

[12] The method for producing a modified carbon black according to [11], in which the solvent is water.

[13] The method for producing a modified carbon black according to any one of [10] to [12], comprising mixing carbon black and an aqueous solution of at least one compound selected from the group consisting of a compound represented by formula (I) and a compound represented by formula (II), and granulating followed by drying.

[14] The method for producing a modified carbon black according to any one of [10] to [12], comprising mixing carbon black and water, granulating, thereafter adding an aqueous solution of at least one compound selected from the group consisting of a compound represented by formula (I) and a compound represented by formula (II) and drying.

[15] A rubber composition obtained by kneading the modified carbon black according to any one of [1] to [9], a sulfur component and a vulcanization accelerator.

[16] A vulcanized rubber obtained by subjecting the rubber composition according to [15] to a heat treatment.

[17] A pneumatic tire produced by processing the rubber composition according to [15].

[18] A tire belt comprising a steel cord coated with the vulcanized rubber according to [16].

[19] A tire carcass comprising a carcass fiber cord coated with the vulcanized rubber according to [16].

[20] A side wall for a tire, an inner liner for a tire, a cap tread for a tire, an under tread for a tire or a pneumatic tire comprising the vulcanized rubber according to [16].

DESCRIPTION OF EMBODIMENTS

Examples of carbon black may include carbon black produced by a production process known in the art such as an oil furnace process, a gas furnace process and an acetylene process, and specific examples thereof may include furnace black, channel black and acetylene black. Carbon black in the form of powder may be used as it is or granulated by e.g., dry granulation or wet granulation and put in use.

As carbon black, commercially available products can be used. Examples of the commercially available products may include HAF (High Abrasion Furnace), SAF (Super Abrasion Furnace), ISAF (Intermediate SAF), FEF (Fast Extrusion Furnace), MAF, GPF (General Purpose Furnace), and SRF (Semi-Reinforcing Furnace) described in "Rubber Industry Handbook <4th edition>" edited by the Society of Rubber Industry, Japan, page 494.

Also, surface-treated carbon black such as surface-oxidized carbon black and carbon black which is obtained by attaching silica (0.1 to 50 mass %) to the surface of carbon black may be used.

A CTAB (Cetyl Tri-methyl Ammonium Bromide) surface area of carbon black is generally 20 to 400 $m^2/g$, a nitrogen adsorption specific surface area thereof is generally 5 to 200 $m^2/g$, a particle size thereof is generally 10 to 500 nm, a nitrogen-element content thereof is generally 0 to 1% and a sulfur-element content thereof is generally 0.001 to 1%.

A compound represented by formula (I) (hereinafter, sometimes referred to as compound (I)) will be described.

Examples of the alkyl group having 1 to 6 carbon atoms may include a methyl group, an ethyl group, an n-propyl group, an isopropyl group, an n-butyl group, an isobutyl group, a sec-butyl group, a tert-butyl group, a heptyl group and a hexyl group. Example of the alkanediyl group having 2 to 6 carbon atoms, which is formed by mutual binding of $P^1$ and $P^2$, may include an ethylene group (dimethylene group), a trimethylene group, a tetramethylene group, a pentamethylene group and a hexamethylene group.

$P^1$ and $P^2$ are each preferably a hydrogen atom.

m is preferably 2 to 6 and more preferably 3.

$M^{n+}$ represents $H^+$ or an n-valent metal cation. Examples of the metal cation may include alkaline metal cations such as a lithium cation, a sodium cation, a potassium cation and a cesium cation; alkaline-earth metal cations such as a magnesium cation, a calcium cation, a strontium cation and a barium cation; a manganese cation; an iron cation; a copper cation; and a zinc cation. $M^{n+}$ is preferably $H^+$, a lithium cation, a sodium cation, a potassium cation or a cesium cation and more preferably $H^+$ or a sodium cation.

Examples of an S-(aminoalkyl)thiosulfuric acid may include S-(aminoethyl)thiosulfuric acid, S-(aminopropyl)thiosulfuric acid, S-(aminobutyl)thiosulfuric acid, S-(aminopentyl)thiosulfuric acid, S-(aminohexyl)thiosulfuric acid, S-(aminoheptyl)thiosulfuric acid, S-(aminooctyl)thiosulfuric acid and S-(aminononyl)thiosulfuric acid.

Examples of a salt of S-(aminoalkyl) sulfuric acid may include sodium S-(aminoethyl)thiosulfate, sodium S-(aminopropyl)thiosulfate, sodium S-(aminobutyl)thiosulfate, sodium S-(aminopentyl)thiosulfate, sodium S-(aminohexyl)thiosulfate, sodium S-(aminoheptyl)thiosulfate, sodium S-(aminooctyl)thiosulfate and sodium S-(aminononyl)thiosulfate. Examples of an S—(N,N-dialkylaminoalkyl)thiosulfuric acid may include S—(N,N-dimethylaminoethyl)thiosulfuric acid, S—(N,N-dimethylaminopropyl)thiosulfuric acid, S—(N,N-dimethylaminobutyl)thiosulfuric acid, S—(N,N-dimethylaminopentyl)thiosulfuric acid, S—(N,N-dimethylaminohexyl)thiosulfuric acid, S—(N,N-dimethylaminoheptyl)thiosulfuric acid, S—(N,N-dimethylaminooctyl)thiosulfuric acid and S—(N,N-dimethylaminononyl)thiosulfuric acid. Examples of a salt of S—(N,N-dialkylaminoalkyl)thiosulfuric acid may include sodium S—(N,N-dimethylaminoethyl)thiosulfate, sodium S—(N,N-dimethylaminopropyl)thiosulfate, sodium S—(N,N-dimethylaminobutyl)thiosulfate, sodium S—(N,N-dimethylaminopentyl)thiosulfate, sodium S—(N,N-dimethylaminohexyl)thiosulfate, sodium S—(N,N-dimethylaminoheptyl)thiosulfate, sodium S—(N,N-dimethylaminooctyl)thiosulfate and sodium S—(N,N-dimethylaminononyl)thiosulfate. Examples of an S—(N-monoalkylaminoalkyl)thiosulfuric acid may include S—(N-methylaminoethyl)thiosulfuric acid, S—(N-methylaminopropyl)thiosulfuric acid, S—(N-methylaminobutyl)thiosulfuric acid, S—(N-methylaminopentyl)thiosulfuric acid, S—(N-methylaminohexyl)thiosulfuric acid, S—(N-methylaminoheptyl)thiosulfuric acid, S—(N-methylaminooctyl)thiosulfuric acid and S—(N-methylaminononyl)thiosulfuric acid. Examples of a salt of S—(N-monoalkylaminoalkyl)thiosulfuric acid may include sodium S—(N-methylaminoethyl)thiosulfate, sodium S—(N-methylamino propyl)thiosulfate, sodium S—(N-methylaminobutyl)thiosulfate, sodium S—(N-methylaminopentyl)thiosulfate, sodium S—(N-methylaminohexyl)thiosulfate, sodium S—(N-methylaminoheptyl)thiosulfate, sodium S—(N-methylaminooctyl)thiosulfate and sodium S—(N-methylaminononyl)thiosulfate.

A compound (I) can be obtained, for example, by reacting a compound represented by formula (I-2) and a hydrogen halide to obtain a hydrohalogenic acid salt of a compound represented by formula (I-3), and reacting the hydrohalogenic acid salt of a compound represented by formula (I-3) obtained and a metal salt of thiosulfuric acid. Hereinafter, a compound represented by formula (I-2) may be sometimes referred to as a compound (I-2) and a compound represented by formula (I-3) as a compound (I-3).

In formula (I-2), $P^3$ represents a hydroxy group or an alkoxy group having 1 to 8 carbon atoms; and $P^1$, $P^2$ and m are the same as defined above.

In formula (I-3), $X^1$ represents a halogen atom; and $P^1$, $P^2$ and m are the same as defined above.

Examples of a method for producing a compound (I-2) may include a method shown in the following scheme. A compound (I-2) can be produced by subjecting acrylonitrile to catalytic reduction using Raney nickel in an alcohol under a hydrogen atmosphere and thereafter, subjecting to N-alkylation, as necessary.

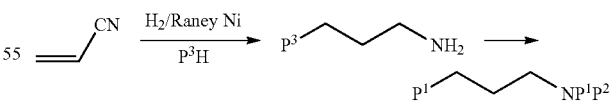

$P^1$, $P^2$ and $P^3$ are the same as defined above.

Examples of the alkoxy group having 1 to 8 carbon atoms, represented by $P^3$ may include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an n-hexyloxy group, a cyclohexyloxy group, an n-heptyloxy group, an n-octyloxy group and a 2-ethylhexyloxy group; and preferably, a methoxy group is mentioned.

The compound (I-2) is preferably 3-methoxypropylamine, 3-ethoxypropylamine, 3-n-propyloxypropylamine, 3-isopropyloxypropylamine, 3-n-butyloxypropylamine, 3-isobutyloxypropylamine, 3-sec-butyloxypropylamine, 3-tert-butyloxypropylamine, 3-n-pentyloxypropylamine, 3-n-hexyloxypropylamine, 3-n-heptyloxypropylamine, 3-n-octyloxypropylamine or 3-(2-ethylhexyloxyl)propylamine and more preferably 3-methoxypropylamine.

Examples of commercially available products of the compound (I-2) may include 3-hydroxypropylamine (Tokyo Chemical Industry Co., Ltd.), 3-methoxypropylamine (Tokyo Chemical Industry Co., Ltd.), 3-ethoxypropylamine (Tokyo Chemical Industry Co., Ltd.), 3-n-propyloxypropylamine (Tokyo Chemical Industry Co., Ltd.), 3-isopropyloxypropylamine (Tokyo Chemical Industry Co., Ltd.), 3-n-butyloxypropylamine (Tokyo Chemical Industry Co., Ltd.) and 3-(2-ethylhexyloxyl)propylamine (Tokyo Chemical Industry Co., Ltd.).

Examples of the hydrogen halide may include hydrogen fluoride, hydrogen chloride, hydrogen bromide and hydrogen iodide; and preferably hydrogen chloride or hydrogen bromide and more preferably hydrogen chloride is mentioned.

The amount of hydrogen halide used relative to a compound (I-2) (100 moles) is generally 200 to 1500 moles, preferably 300 to 1000 moles and more preferably 300 to 900 moles.

The reaction between a compound (I-2) and a hydrogen halide is generally carried out in the absence of an organic solvent or in the presence of a solvent nonresponsive to the reaction and preferably carried out in the absence of an organic solvent.

After completion of the reaction between a compound (I-2) and a hydrogen halide, the obtained mixture is cooled and, if necessary, subjected to a general separation operation such as filtration to obtain a hydrogen halide salt of a compound (I-3).

$X^1$ represents a halogen atom. Examples of the halogen atom may include a fluorine atom, a chlorine atom, a bromine atom and an iodine atom; and preferably a chlorine atom or a bromine atom and more preferably a chlorine atom is mentioned.

Examples of the compound (I-3) may include 2-fluoroethylamine, 2-chloroethylamine, 2-bromoethylamine, 2-iodoethylamine, 3-fluoropropylamine, 3-chloropropylamine, 3-bromopropylamine, 3-iodopropylamine, 4-fluorobutylamine, 4-chlorobutylamine, 4-n-bromobutylamine, 4-iodobutylamine, 5-fluoropentylamine, 5-chloropentylamine, 5-bromopentylamine, 5-iodopentylamine, 6-chlorohexylamine, 7-chloroheptylamine, 8-chlorooctylamine and 9-chlorononylamine.

Examples of the hydrogen halide to form a salt with a compound (I-3) may include hydrogen fluoride, hydrogen chloride, hydrogen bromide and hydrogen iodide; and preferably hydrogen chloride or hydrogen bromide and more preferably hydrogen chloride is mentioned.

A hydrogen halide salt of a compound (I-3) and a metal salt of thiosulfuric acid are reacted to obtain a compound (I). The reaction between a hydrogen halide salt of a compound (I-3) and a metal salt of thiosulfuric acid is carried out generally by dissolving the hydrogen halide salt of a compound (I-3) in a solvent, controlling pH of the obtained solution by mixing an acid or a base thereto; then adding a metal salt of thiosulfuric acid and heating the resultant mixture while stirring.

The solvent is not limited as long as it is nonresponsive to a hydrogen halide salt of a compound (I-3) and a metal salt of thiosulfuric acid and can dissolve a metal salt of thiosulfuric acid. Generally, an alcohol having 1 to 4 carbon atoms, water or a solvent mixture of an alcohol having 1 to 4 carbon atoms and water or the like is used, preferably water or a solvent mixture of an alcohol having 1 to 4 carbon atoms and water, and more preferably water is used.

The amount of solvent used relative to a hydrogen halide salt of a compound (I-3) (1 part by weight) is generally 0.5 to 40 parts by weight, preferably 1 to 20 parts by weight and more preferably 1.5 to 10 parts by weight.

As the acid, an inorganic acid such as hydrofluoric acid, bromic acid, hydrochloric acid, sulfuric acid, phosphoric acid and boric acid or an organic acid such as acetic acid and para-toluene sulfonic acid is generally used.

As the base, a hydroxide of an alkaline metal such as sodium hydroxide is generally used.

The pH is controlled to fall generally within the range of pH1 to 7, preferably pH2 to 5 and more preferably pH2 to 3.5.

As the metal salt of thiosulfuric acid, sodium thiosulfate, potassium thiosulfate, calcium thiosulfate or the like is generally used, and sodium thiosulfate is preferably used. A metal salt of thiosulfuric acid may be a hydrate.

The amount of metal salt of thiosulfuric acid used relative to a hydrogen halide salt of a compound (I-3) (100 moles) is generally 80 to 500 moles, preferably 90 to 200 mole and more preferably 100 to 110 moles.

After completion of the reaction, a compound (I) can be taken out by a general isolation operation such as general crystallization.

A compound represented by formula (II) (hereinafter, sometimes referred to as a compound (II)) will be described.

A compound (II) is preferably a compound represented by the following formula (II-1).

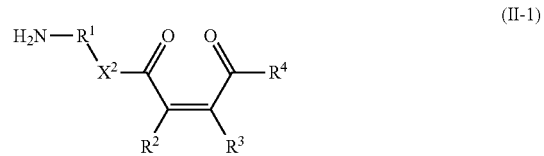

(II-1)

In formula (II-1), $R^1$, $R^2$, $R^3$, $R^4$ and X are the same as defined above.

Examples of a linear alkanediyl group having 1 to 12 carbon atoms may include a methylene group, an ethylene group, a trimethylene group, a tetramethylene group, a pentamethylene group and a hexamethylene group. Examples of branched alkanediyl group having 1 to 12 carbon atoms may include an isopropylene group, an isobutylene group, a 2-methyltrimethylene group, an isopentylene group, an isohexylene group, an isooctylene group, a 2-ethylhexylene group and an isodecylene group.

Examples of a cycloalkanediyl group having 3 to 12 carbon atoms may include a cyclopropylene group, a cyclopentylene group, a cyclohexylene group, a methylcyclohexylene group, a cyclododecylene group and a tert-butylcyclohexylene group; and preferably, a cyclopentylene group, a cyclohexylene group, a methylcyclohexylene group or a tert-butyl cyclohexylene group is mentioned.

Examples of a substituent that an alkanediyl group having 1 to 12 carbon atoms and a cycloalkanediyl group having 3 to 12 carbon atoms optionally have, may include an alkyl group having 1 to 4 carbon atoms, an aryl group having 6 to 10 carbon atoms, an alkoxy group having 1 to 4 carbon atoms, an acyl group having 1 to 7 carbon atoms, an alkoxycarbonyl group having 3 or 4 carbon atoms, an aryloxycarbonyl group having 7 to 11 carbon atoms and an acyloxy group having 2 to 7 carbon atoms. Examples of the alkyl group having 1 to 4 carbon atoms may include a methyl group, an ethyl group, an n-propyl group, an n-butyl group and a tert-butyl group. Examples of the aryl group having 6 to 10 carbon atoms may include a phenyl group, a 4-methylphenyl group and a naphthyl group. Examples of the alkoxy group having 1 to 4 carbon atoms may include a methoxy group, an ethoxy group and a butoxy group. Examples of the acyl group having 1 to 7 carbon atoms may include an acetyl group, a benzoyl group, a formyl group and a pivaloyl group. Examples of the alkoxycarbonyl group having 3 or 4 carbon atoms may include a methoxycarbonyl group and an ethoxycarbonyl group. Examples of the aryloxycarbonyl group having 7 to 11 carbon atoms may include an acetoxy group and a benzoyloxy group.

Examples of the alkanediyl group having 1 to 12 carbon atoms and having a substituent may include the following groups.

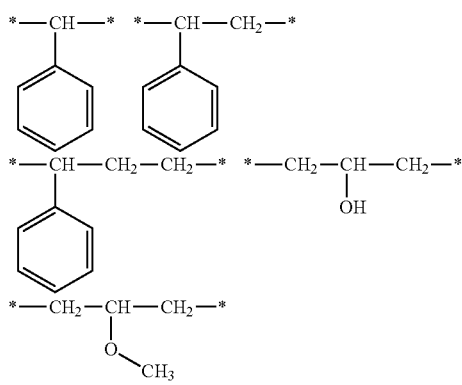

Examples of the alkanediyl group having 1 to 12 carbon atoms, represented by $B^1$ and $B^2$ are the same as defined above.

Examples of the divalent aromatic hydrocarbon group having 6 to 12 carbon atoms, represented by Ar may include a phenylene group, a naphthylene group and a biphenylene group.

Examples of *—$B^1$—Ar—$B^2$—* group represented by $R^1$ may include a phenylene group, a naphthylene group, a biphenylene group and the following group wherein * represents a bond.

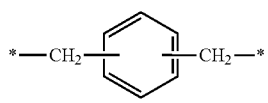

Hydrogen atoms contained in Ar may be substituted with one or more groups selected from the group consisting of an alkyl group having 1 to 4 carbon atoms, an alkoxy group having 1 to 4 carbon atoms, a hydroxy group, a nitro group, a cyano group, a sulfo group and a halogen atom.

$R^1$ is preferably an alkylene group having 2 to 12 carbon atoms, a phenylene group or the following group and more preferably a phenylene group.

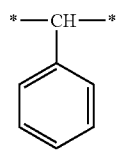

$H_2N$— binds to any positions of a group represented by $R^1$.

Examples of the halogen atom represented by $R^2$ and $R^3$ may include fluorine, chlorine, bromine and iodine.

Examples of the alkyl group having 1 to 6 carbon atoms, represented by $R^2$ and $R^3$ may include a methyl group, an ethyl group, an n-propyl group, an isopropyl group, an n-butyl group, an isobutyl group, a sec-butyl group, a tert-butyl group, an n-pentyl group, an isopentyl group and an n-hexyl group.

Examples of the aryl group having 6 to 12 carbon atoms, represented by $R^2$ and $R^3$ may include a monocyclic aromatic hydrocarbon or a condensed aromatic hydrocarbon; and preferably a phenyl group, a naphthyl group and a biphenyl group are mentioned.

Examples of the alkoxy group having 1 to 6 carbon atoms, represented by $R^2$ and $R^3$ may include a methoxy group, an ethoxy group, an n-propoxy group, an isopropoxy group, an n-butoxy group, an isobutoxy group, a sec-butoxy group, a tert-butoxy group, an n-pentoxy group, an isopentoxy group and an n-hexyloxy group.

The number of carbon atoms of the alkanediyl group having 2 to 12 carbon atoms, which is formed by combination of $R^2$ and $R^3$ with each other, is preferably 3 or 4.

Examples of the alkanediyl group having 2 to 12 carbon atoms, which is formed by combination of $R^2$ and $R^3$ with each other, may include a linear alkanediyl group and a branched alkanediyl group. Examples of the linear alkanediyl group may include an ethylene group, a trimethylene group, a tetramethylene group, a pentamethylene group and a hexamethylene group. Examples of the branched alkanediyl group may include a propylene group, an isopropylene group, an isobutylene group, a 2-methyltrimethylene group, an isopentylene group, an isohexylene group, an isooctylene group, a 2-ethylhexylene group and an isodecylene group.

$R^2$ is preferably a hydrogen atom; $R^3$ is preferably a hydrogen atom or an alkyl group having 1 to 6 carbon atoms and more preferably $R^2$ and $R^3$ are hydrogen atoms.

Examples of the alkoxy group having 1 to 6 carbon atoms, represented by $R^4$ may include a methoxy group, an ethoxy group, an n-propoxy group, an isopropoxy group, an n-butoxy group, an isobutoxy group, a sec-butoxy group, a tert-butoxy group, an n-pentoxy group, an isopentoxy group and an n-hexyloxy group.

Examples of the aryloxy group having 6 to 12 carbon atoms, represented by $R^4$ may include a group obtained by binding an oxy group to an aryl group having 6 to 12 carbon atoms, represented by $R^2$ and $R^3$, such as a phenyloxy group, a naphthyloxy group and a biphenyloxy group.

Examples of the arylalkoxy group having 7 to 15 carbon atoms, represented by $R^4$ may include a phenylethyloxy group, a benzyloxy group and a phenylpropyloxy group.

Examples of the amino group having 0 to 12 carbon atoms, represented by $R^4$ may include a methylamino group, an ethylamino group, a phenylamino group, an ethylmethylamino group, a dimethylamino group, a diethylamino group, a methylphenylamino group, an ethylphenylamino group and a diphenylamino group.

$Y^{n+}$ represents a cation which can form a carboxylate salt.

Examples of Y may include an alkaline metal, an alkaline-earth metal, a metal selected from transition elements of IB and IIB families of the periodical table and an organic base such as amine; for example, lithium (Li), sodium (Na), potassium (K), magnesium (Mg), calcium (Ca), zinc (Zn), copper (Cu), silver (Ag), $NH_4$, $NH(C_2H_5)_3$ and $NH(C_2H_5)(i-C_3H_7)_2$ are mentioned.

Examples of $Y^{n+}$ may include $Li^+$, $Na^+$, $K^+$, $Mg^+$, $Ca^{2+}$, $Zn^{2+}$, $Cu^{2+}$, $Ag^+$, $(NH_4)^+$, $[NH(C_2H_5)_3]^+$ and $[NH(C_2H_5)(i-C_3H_7)_2]^+$.

As $R^4$, a hydroxy group or $-O-(Y^{n+})^{1/n}$ is preferable and a hydroxy group or $-O^-(Y^{n+})^{1/n}$ (Y represents an alkaline metal) is more preferable.

Specific examples of a compound (II) will be shown below.

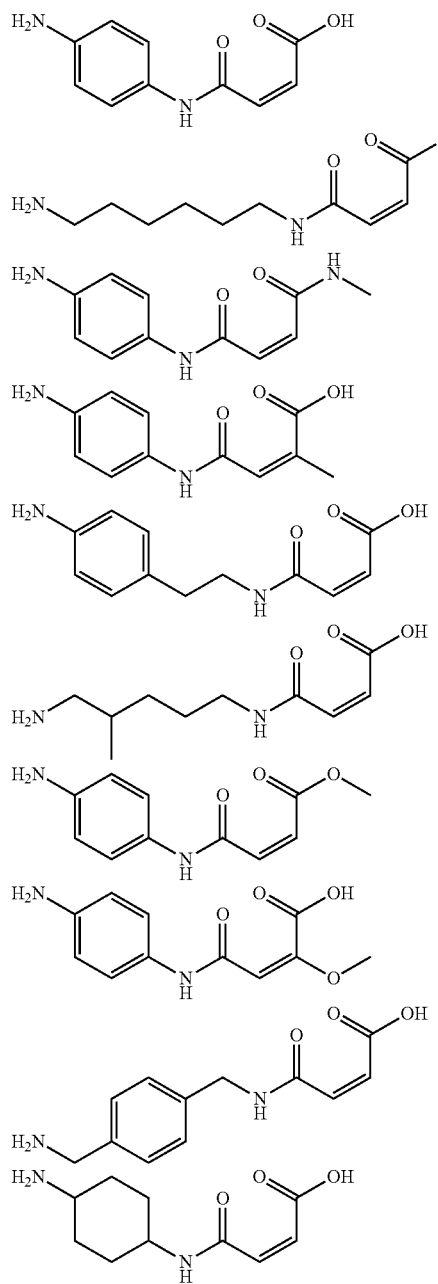
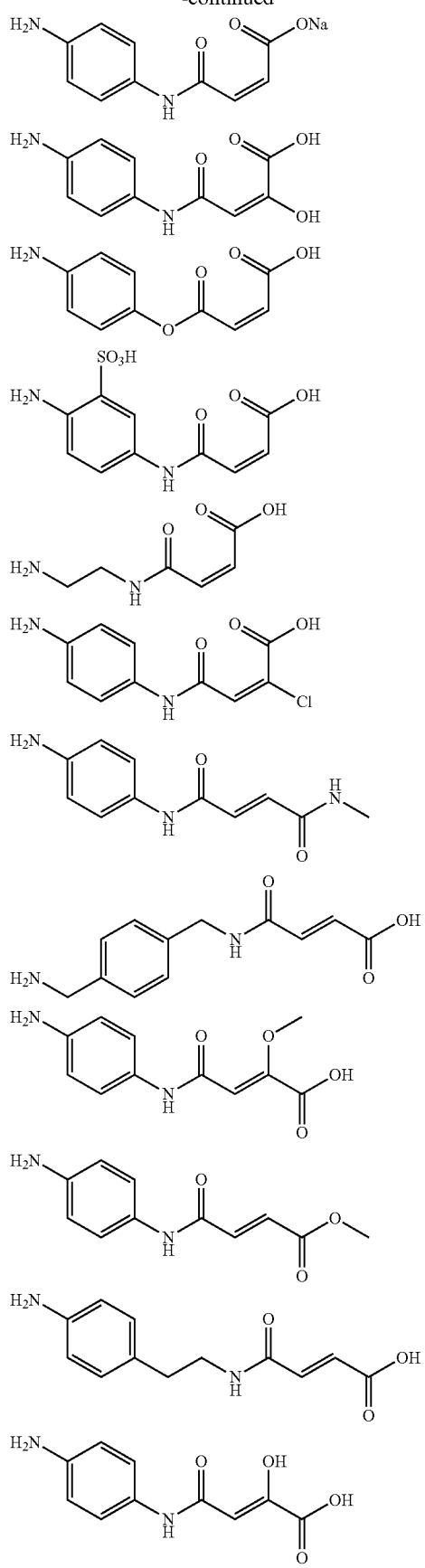

-continued

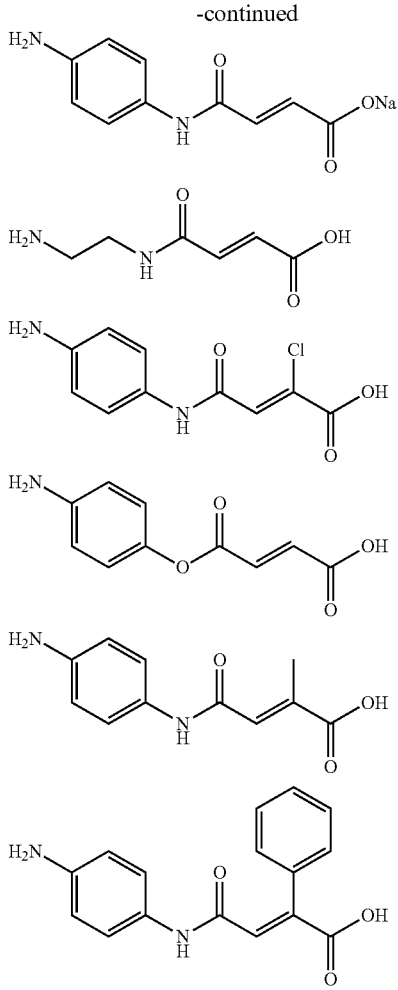

A compound (II) may form a solvate with methanol or water.

A compound (II) can be produced by the method shown in the following scheme:

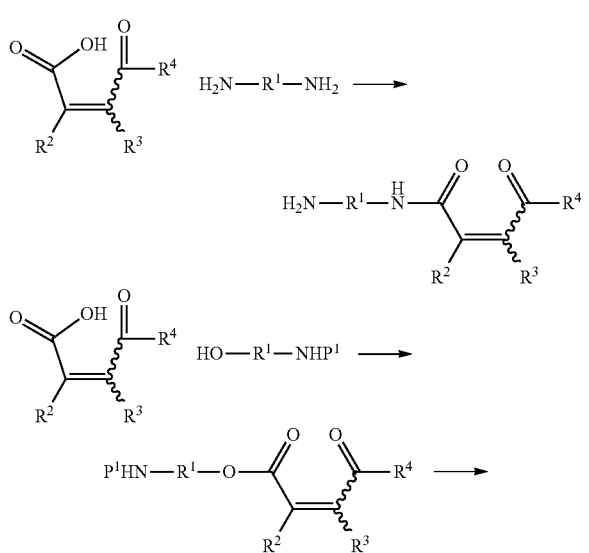

-continued

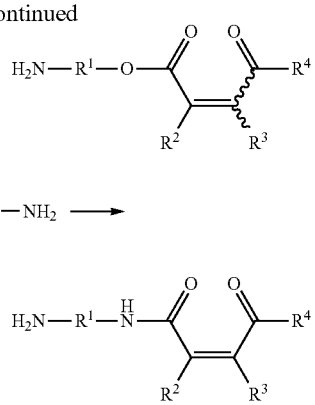

wherein $R^1$, $R^2$, $R^3$ and $R^4$ are the same as defined above;
$P^1$ represents a protecting group; and
a wavy line represents a carbon-carbon double bond and binding between $R^3$ and CO—$R^4$, and shows that the structure of the carbon-carbon double bond is E-form, Z-form or a mixture of E-form and Z-form, in which the E-form refers to a structure wherein $R^2$ and $R^3$ are positioned on the opposite side to the carbon-carbon double bond; whereas, the Z-form refers to a structure wherein $R^2$ and $R^3$ are positioned in the same side as the carbon-carbon double bond.

Examples of the protecting group represented by $P^1$ may include a tert-butoxycarbonyl.

When the structure of the carbon-carbon double bond is the Z-form, a compound can be produced from the corresponding acid anhydride to maleic anhydride or the like. Thereafter, the compound is subjected to an esterification reaction, an amidation reaction or a salt forming reaction to produce a desired compound. In the above production method, if a protecting group is used for convenience sake, the protecting group can be removed by a method generally used in the art.

Next, A modified carbon black of the present invention will be described.

A modified carbon black refers to carbon black on the surface of which an organic substance is adsorbed by means of electrostatic interaction or chemical interaction such as a hydrogen bond or an intermolecular force.

The modified carbon black of the present invention contains carbon black and at least one compound selected from the group consisting of a compound (I) and a compound (II) and can generally be obtained by mixing carbon black and at least one compound selected from the group consisting of a compound (I) and a compound (II). Mixing is performed in the presence of a solvent or in the absence of a solvent; however, mixing is preferably performed in the presence of a solvent for the reason that mixing can be easily made uniformly. Examples of the solvent may include an alcohol having 1 to 4 carbon atoms, tetrahydrofuran, chloroform, N,N-dimethylformamide, water and a solvent mixture of these. In consideration of economic efficiency and effect on the environment, water is preferably mentioned. Generally, mixing is performed in the absence of a rubber component. If a rubber component is present, adsorption of carbon black and at least one compound selected from the group consisting of a compound (I) and a compound (II) is prevented. Thus, the presence of a rubber component is not preferable.

The CTAB (Cetyl Tri-methyl Ammonium Bromide) surface area of the modified carbon black of the present invention is generally 20 to 400 m$^2$/g and preferably 20 to 250 m²/g for the reason that the modified carbon black becomes suitable as a component of a rubber composition for tire tread.

The nitrogen adsorption specific surface area of the modified carbon black of the present invention is generally 5 to 200 m²/g and preferably 20 to 200 m²/g for the reason that the modified carbon black becomes suitable as a component of a rubber composition for tire tread.

The particle size of the modified carbon black of the present invention is generally 10 to 500 nm and preferably 10 to 50 nm for the reason that the modified carbon black becomes suitable as a component of a rubber composition for tire tread.

The nitrogen-element content of a modified carbon black containing a compound (I) is higher than the nitrogen-element content of an unmodified carbon black and is generally 0.01 to 10 wt %. The sulfur-element content thereof is higher than the sulfur-element content of unmodified carbon black, and is generally 0.04 to 13.5 wt %. The nitrogen-element content is preferably 0.01 to 5 wt %, more preferably 0.1 to 5 wt % and further preferably 0.11 to 3 wt %. The sulfur-element content is preferably 0.04 to 6.75 wt %, more preferably 0.4 to 6.75 wt % and further preferably 0.5 to 3 wt %. If the nitrogen-element content falls within the above range, the viscoelasticity of vulcanized rubber tends to be more improved. Thus, the above range is preferable. The nitrogen-element content can be measured generally by a CHN automatic analyzer or a micro-analytical apparatus for nitrogen and carbon, and is measured preferably by an NCH quantitative analyzer, SUMIGRAPH NCH-22F (manufactured by Sumika Chemical Analysis Service, Ltd.). The sulfur-element content can be measured generally by a flask combustion ion chromatograph apparatus, and is measured preferably by ion chromatograph apparatus, DX-AQ-1120 (manufactured by Nippon Dionex K.K.).

The nitrogen-element content of a modified carbon black containing a compound (II) is higher than the nitrogen-element content of an unmodified carbon black, and is generally 0.01 to 10 wt %, preferably 0.01 to 5 wt %, more preferably 0.1 to 5 wt % and further preferably 0.11 to 3 wt %. If the nitrogen-element content falls within the above range, the viscoelasticity of vulcanized rubber tends to be more improved. Thus, the above range is preferable. The nitrogen-element content can be measured by the same method as in the measurement of the nitrogen-element content of a modified carbon black containing a compound (I).

The content of at least one compound selected from the group consisting of a compound (I) and a compound (II) is 0.1 to 50 parts by weight relative to carbon black (100 parts by weight), preferably 0.1 to 25 parts by weight, more preferably 0.5 to 10 parts by weight and further preferably 1.5 to 5 parts by weight. If the content of a compound falls within the above range, the viscoelasticity of vulcanized rubber tends to be improved. Thus, the above range is preferable. The content can be calculated from the nitrogen-element content.

In a case where carbon black is mixed with an excessive amount of at least one compound selected from the group consisting of a compound (I) and a compound (II), a case where a solvent is not used in producing a modified carbon black or a case where a solvent is used but the solvent is distilled off without filtration, a modified carbon black and at least one compound (free state) selected from the group consisting of a compound (I) and a compound (II) not adsorbed to carbon black are sometimes present as a mixture. In this case, such a mixture is washed with water to remove the at least one compound (free state) selected from the group consisting of a compound (I) and a compound (II) and thereafter the nitrogen-element content is measured. In this manner, the nitrogen-element content of a modified carbon black and the content of at least one compound selected from the group consisting of a compound (I) and a compound (II) in the modified carbon black can be calculated.

Examples of a method for producing a modified carbon black by mixing in the presence of a solvent may include the following methods.

(1) Method comprising mixing carbon black, at least one compound selected from the group consisting of a compound (I) and a compound (II) and a solvent and thereafter distilling off the solvent.

(2) Method comprising mixing carbon black, at least one compound selected from the group consisting of a compound (I) and a compound (II) and a solvent, and thereafter obtaining a solid substance by filtration.

(3) Method comprising mixing carbon black, at least one compound selected from the group consisting of a compound (I) and a compound (II) and a solvent, thereafter obtaining a solid substance by filtration, and distilling off the solvent contained in the solid substance.

The order of mixing carbon black, at least one compound selected from the group consisting of a compound (I) and a compound (II) and a solvent is not limited. At least one compound selected from the group consisting of a compound (I) and a compound (II) is dissolved or dispersed in a solvent and thereafter the resultant mixture may be added to carbon black, or at least one compound selected from the group consisting of a compound (I) and a compound (II) is dissolved or dispersed in a solvent and thereafter carbon black may be added thereto. Alternatively, at least one compound selected from the group consisting of a compound (I) and a compound (II) and carbon black are mixed and thereafter a solvent is added to the mixture and the resultant is mixed. Generally, a method of dissolving at least one compound selected from the group consisting of a compound (I) and a compound (II) in a solvent and thereafter adding carbon black and mixing it, is used. Furthermore, these may be simultaneously added or sequentially added.

The mixing ratio of carbon black and at least one compound selected from the group consisting of a compound (I) and a compound (II), more specifically, the blend ratio of at least one compound selected from the group consisting of a compound (I) and a compound (II) relative to carbon black (100 parts by weight), is generally 0.1 to 100 parts by weight and preferably 0.1 to 50 parts by weight.

The amount of solvent relative to carbon black (100 parts by weight) is generally 0.1 to 1000 parts by weight and preferably 1 to 500 parts by weight.

Examples of a method for mixing carbon black, at least one compound selected from the group consisting of a compound (I) and a compound (II) and a solvent may include a method of mixing raw materials by e.g., a melt-kneader {batch kneader (reaction tank, etc.)}, an ultrasonic homogenizer, a high pressure homogenizer, a process homogenizer, a ball mill or a beads mill, in accordance with the aforementioned manner.

The mixing temperature is generally 5 to 400° C., preferably 5 to 300° C., more preferably 5 to 250° C. and particularly preferably more than 100° C. to 250° C. or less.

The mixing time is generally one minute to 24 hours, preferably one minute to 12 hours.

Mixing may be performed under a normal pressure condition, a pressurized condition or a reduced pressure condition.

The heating temperature during distillation of a solvent is generally 5 to 400° C., preferably 5 to 300° C. and more preferably 5 to 250° C.

The pressure during distillation of a solvent is generally 0.01 to 1.0 MPa and preferably 0.02 to 0.09 MPa.

Examples of a method for producing a modified carbon black by mixing in the absence of a solvent may include a method of mixing carbon black and at least one compound selected from the group consisting of a compound (I) and a compound (II).

The modified carbon black obtained by mixing in the presence of a solvent or in the absence of a solvent is granulated by a method known in the art such as a wet granulation method or a dry granulation method as described in e.g., Japanese Patent Application Laid-Open No. 52-130481, Japanese Patent Publication No. 54-20478, and Japanese Patent Application Laid-Open No. 63-83171 to obtain granules.

The granules in the present invention refer to particles having a particle size of 0.01 to 10 mm. The number average particle size of granules is generally 0.01 to 10 mm and preferably 0.1 to 5 mm. The number average particle size is preferably 0.1 to 5 mm for the reason that handling of a modified carbon black is excellent.

In the wet granulation method, production and granulation of a modified carbon black can be carried out in a single step. More specifically, carbon black, at least one compound selected from the group consisting of a compound (I) and a compound (II) and water for granulation are added to a wet granulator and the mixture is subjected to a granulation step to obtain granules of a modified carbon black. In the granulation step, a series of stages, i.e., a mixture stage, a granulation stage and a dry stage, are included. At least one compound selected from the group consisting of a compound (I) and a compound (II) may be directly added simultaneously or sequentially, or may be dissolved or dispersed in water and then simultaneously or sequentially added. Preferably, a method of dissolving the compound in water and then simultaneously adding it is employed. A stage of adding at least one compound selected from the group consisting of a compound (I) and a compound (II) is not limited as long as it is performed within a granulation step; however, the compound is preferably added in granulation stage where carbon black is tumbled in a wet granulator or in a dry stage.

The concentration of an aqueous solution containing at least one compound selected from the group consisting of a compound (I) and a compound (II) dissolved in water, is preferably 0.1 to 50 wt %.

The mixing ratio of carbon black and at least one compound selected from the group consisting of a compound (I) and a compound (II), i.e., the blend ratio of at least one compound selected from the group consisting of a compound (I) and a compound (II) relative to carbon black (100 parts by weight), is generally 0.1 to 100 parts by weight and preferably 0.1 to 50 parts by weight.

Mixing may be performed under a normal pressure condition, a pressurized condition or a reduced pressure condition.

Drying temperature is generally 5 to 400° C. and preferably 50 to 350° C.

The drying time is generally one minute to 24 hours and preferably one minute to 12 hours.

Next, a rubber composition obtained by kneading the modified carbon black of the present invention or granules of the modified carbon black and a rubber component will be described. First, step (A) of kneading the modified carbon black of the present invention or granules of the modified carbon black and a rubber component will be described. The amount of a modified carbon black of the present invention and granules of the modified carbon black used relative to the rubber component (100 parts by weight) described later preferably falls within the range of 5 to 150 parts by weight and more preferably 5 to 75 parts by weight.

Examples of the rubber component may include not only natural rubber, an epoxidized natural rubber, a deproteinized natural rubber and other modified natural rubbers, but also various types of synthetic rubbers such as polyisoprene rubber (IR), a styrene-butadiene copolymer rubber (SBR), a polybutadiene rubber (BR), an acrylonitrile-butadiene copolymer rubber (NBR), an isoprene-isobutylene copolymer rubber (IIR), an ethylene-propylene-diene copolymer rubber (EPDM) and halogenated butyl rubber (HR); however, a highly unsaturated rubber such as a natural rubber, a styrene-butadiene copolymer rubber and a polybutadiene rubber is preferably used. Particularly preferably, a natural rubber is used. Combination use of several rubber components such as a combination use of a natural rubber and a styrene-butadiene copolymer rubber and combination use of a natural rubber and a polybutadiene rubber is also effective.

Examples of the natural rubber may include natural rubbers of RSS#1, RSS#3, TSR20 and SIR20 grades. As the epoxidized natural rubber, an epoxidized natural rubber having an epoxidization degree of 10 to 60 mol % is preferable; examples thereof may include ENR25 and ENR50 manufactured by Kumpulan Guthrie. As the deproteinized natural rubber, a deproteinized natural rubber having a total nitrogen content of 0.3 mass % or less is preferable. As the modified natural rubber, a modified natural rubber having a polar group, which is obtained by previously reacting e.g., 4-vinylpyridine, N,N-dialkylaminoethyl acrylate (e.g., N,N-diethylaminoethyl acrylate) or 2-hydroxyacrylate with a natural rubber, is preferably used.

Examples of SBR may include emulsion-polymerized SBR and solution-polymerized SBR, which are described in "Rubber Industry Handbook <4th edition>" edited by the Society of Rubber Industry, Japan, pages 210 and 211. Of them, solution-polymerized SBR is preferably used as a rubber composition for tread. Furthermore, solution-polymerized SBR, which is obtained by modifying a molecular terminal with 4,4'-bis(dialkylamino)benzophenone, such as "NIPOL (registered trademark) NS 116" manufactured by ZEON Corporation; solution-polymerized SBR, which is obtained by modifying a molecular terminal with a halogenated tin compound, such as "SL574" manufactured by JSR Corporation; a silane modified solution-polymerized SBR such as commercially available products, "E10" and "E15" manufactured by Asahi Kasei Corporation; and solution-polymerized SBR having any one of nitrogen, tin, and silicon or a plurality of elements of these at a molecular terminal, which is obtained by modifying the molecular terminal by singly using any one of a lactam compound, an amide compound, a urea compound, an N,N-dialkylacrylic amide compound, an isocyanate compound, an imide compound, a silane compound (e.g., trialkoxysilane compound) having an alkoxy group and an amino silane compound; or by using two or more of a plurality of compounds different in type as those mentioned above, for example, a tin compound and a silane compound having an alkoxy group and an alkylacrylic amide compound and a silane compound having an alkoxy group, are particularly preferably used. Oil-extended SBR, which is obtained by adding an oil such as a process oil and an aroma oil to emulsion-polymerized SBR and solution-polymerized SBR, can be preferably used as a rubber composition for tread or the like.

Examples of BR may include solution-polymerized BR such as high cis BR having a cis-1,4 bond (90% or more) and low cis BR having a cis bond (about 35%). Low cis BR having a high vinyl content is preferably used. Furthermore, tin-modified BR, such as "Nipol (registered trademark) BR 1250H" manufactured by ZEON Corporation; and solution-polymerized BR having any one of nitrogen, tin, and silicon or a plurality of elements of these at a molecular terminal, which is obtained by modifying the molecular terminal by singly using any one of 4,4'-bis(dialkylamino)benzophenone, a halogenated tin compound, a lactam compound, an amide compound, a urea compound, an N,N-dialkylacrylic amide compound, an isocyanate compound, an imide compound, a silane compound (e.g., trialkoxysilane compound) having an alkoxy group and an amino silane compound, or by using two or more of a plurality of compounds different in type as those mentioned above, for example, a tin compound and a silane compound having an alkoxy group and an alkylacrylic amide compound and a silane compound having an alkoxy group, are particularly preferably used. These BRs can be preferably used as a rubber composition for tread and a rubber composition for a side wall, and each of them is generally used by blending it with an SBR and/or a natural rubber. It is preferable that the blend ratio in a rubber composition for tread, i.e., the blend ratio of SBR and/or natural rubber relative to the total rubber mass be 60 to 100 mass % and that of BR be 0 to 40 mass %. In a rubber composition for a side wall, it is preferable that the blend ratio of SBR and/or natural rubber relative to the total rubber mass be 10 to 70 mass % and that of BR be 90 to 30 mass %; and further, particularly preferable that the blend ratio of natural rubber relative to the total rubber mass be 40 to 60 mass % and that of BR be 60 to 40 mass %. In this case, a blend of modified SBR and non-modified SBR and a blend of modified BR and non-modified BR are also preferable.

In a rubber composition obtained by kneading the modified carbon black of the present invention or granules of the modified carbon black and a rubber component, other fillers excluding the modified carbon black of the present invention and granules of the modified carbon black, may be contained. Examples of the fillers may include carbon black, silica, talc, clay, aluminium hydroxide and titanium oxide that are generally used in the field of rubber; however carbon black and silica are preferably used, and furthermore carbon black is particularly preferably used. Examples of carbon black may include those described, for example, in "Rubber Industry Handbook <4th edition>" edited by the Society of Rubber Industry, Japan, page 494. Of them, carbon black such as HAF (High Abrasion Furnace), SAF (Super Abrasion Furnace), ISAF (Intermediate SAF), FEF (Fast Extrusion Furnace), MAF, GPF (General Purpose Furnace), and SRF (Semi-Reinforcing Furnace) is preferable. For the rubber composition for tire tread, carbon black having a CTAB (Cetyl Tri-methyl Ammonium Bromide) surface area of 40 to 250 $m^2/g$, a nitrogen adsorption specific surface area of 20 to 200 $m^2/g$ and a particle size of 10 to 50 nm is preferably used and carbon black having a CTAB surface area of 70 to 180 $m^2/g$ is further preferably used. Examples thereof may include N110, N220, N234, N299, N326, N330, N330T, N339, N343, and N351 according to the ASTM standard. Furthermore, surface treated carbon black, which is obtained by attaching silica (0.1 to 50 mass %) to the surface of carbon black, may be included and a combination of carbon black and silica or the like, and a combination of several fillers are effective. In a rubber composition for tire tread, it is preferable to use carbon black alone or both of carbon black and silica. In rubber compositions for a carcass and a side wall, carbon black having a CTAB surface area of 20 to 60 $m^2/g$ and a particle size of 40 to 100 nm is preferably used. Examples thereof may include N330, N339, N343, N351, N550, N568, N582, N630, N642, N660, N662, N754 and N762 according to the ASTM standard. The amount of such a filler used is not particularly limited; however, the amount thereof used preferably falls within the range of 1 to 50 parts by weight based on a rubber component (100 parts by weight).

Examples of silica to be used as a filler may include silica having a CTAB specific surface area of 50 to 180 $m^2/g$ and silica having a nitrogen adsorption specific surface area of 50 to 300 $m^2/g$; and commercially available products such as "AQ" and "AQ-N" manufactured by Tosoh Silica Corporation; "ULTRASIL (registered trademark) VN3", "ULTRASIL (registered trademark) 360" and "ULTRASIL (registered trademark) 7000" manufactured by Degussa; "Zeosil (registered trademark) 115GR", "Zeosil (registered trademark) 1115MP", "Zeosil (registered trademark) 1205MP" and "Zeosil (registered trademark) Z85MP" manufactured by Rhodia Inc.; and "Nipseal (registered trademark) AQ" manufactured by Nippon Silica, can be preferably used. Furthermore, it is also preferable to blend or use silica having a pH value of 6 to 8, silica containing sodium (0.2 to 1.5 mass %), spherical silica having a circularity of 1 to 1.3, a silicone oil such as dimethyl silicone oil and an organic silicon compound containing an ethoxysilyl group, a surface-treated silica with an alcohol such as ethanol or polyethylene glycol and silica having two or more types of different nitrogen adsorption specific surface areas.

The amount of filler used is not particularly limited. When silica is used as a filler, it is preferable to generally add an element such as silicon, capable of binding to silica or a compound having a functional group such as alkoxysilane, described in International Publication No. WO 2010/140704. It is particularly preferable to add bis(3-triethoxysilylpropyl)tetrasulfide ("Si-69" manufactured by Degussa), bis(3-triethoxysilylpropyl)disulfide ("Si-75", manufactured by Degussa) and 3-octanoylthiopropyltriethoxysilane ("NXT silane", manufactured by General Electric Silicons). The timing of adding these compounds is not particularly limited; however, it is preferable to add them to rubber simultaneously with silica. The content of such a compound relative to silica is preferably 2 to 10 mass % and further preferably 7 to 9 mass %. The temperature for blending the compound preferably falls within the range of 80 to 200° C. and further preferably 110 to 180° C. When silica is used as a filler, in addition to silica, an element such as silicon capable of binding to silica or a compound having a functional group such as alkoxysilane, it is also preferable to blend a monovalent alcohol such as ethanol, butanol and octanol; alcohol of a divalent or more such as ethylene glycol, diethylene glycol, triethylene glycol, polyethylene glycol, polypropylene glycol, pentaerythritol and polyether polyol; an N-alkylamine; an amino acid; and liquid polybutadiene having a carboxyl modified or amine modified molecular terminal.

Examples of the aluminum hydroxide may include aluminum hydroxide having a nitrogen adsorption specific surface area of 5 to 250 $m^2/g$ and aluminum hydroxide having a DOP oiling quantity of 50 to 100 ml/100 g.

Next, step (B) where a kneaded product obtained in the step (A), a sulfur component and a vulcanization accelerator are kneaded will be described. In the specification, the "unvulcanized rubber composition" refers to a rubber composition obtained by this step.

Examples of the sulfur component may include powdery sulfur, precipitated sulfur, colloidal sulfur, insoluble sulfur and highly dispersible sulfur. Generally, powdery sulfur is preferable and insoluble sulfur is preferable if a sulfur component is used in a tire member using a large amount of sulfur, such as a belt member. Note that a compound (I) and a metal salt thereof, and a vulcanization accelerator are not included in the sulfur component mentioned above. The amount of sulfur component used relative to a rubber component (100 parts by weight) preferably falls within the range of 0.3 to 5 parts by weight and more preferably 0.5 to 3 parts by weight.

Examples of the vulcanization accelerator may include a thiazole vulcanization accelerator, a sulfenamide vulcanization accelerator and a guanidine vulcanization accelerator described in "Rubber Industry Handbook <4th edition>" (published on Jan. 20, 1994 by the Society of Rubber Industry, Japan), pages 412 and 413.

Specific examples thereof may include N-cyclohexyl-2-benzothiazolylsulfenamide (CBS), N-tert-butyl-2-benzothiazolylsulfenamide (BBS), N,N-dicyclohexyl-2-benzothiazolylsulfenamide (DCBS), 2-mercaptobenzothiazole (MBT), dibenzothiazyldisulfide (MBTS) and diphenylguanidine (DPG). Furthermore, a vulcanizing agent known in the art, i.e., morpholine disulfide, can also be used. When carbon black is used as a filler, it is preferable to use any one of N-cyclohexyl-2-benzothiazolylsulfenamide (CBS), N-tert-butyl-2-benzothiazolylsulfenamide (BBS), N,N-dicyclohexyl-2-benzothiazolylsulfenamide (DCBS) and dibenzothiazyl disulfide (MBTS), in combination with diphenylguanidine (DPG). When silica and carbon black are used in combination as a filler, it is preferable to use any one of N-cyclohexyl-2-benzothiazolylsulfenamide (CBS), N-tert-butyl-2-benzothiazolylsulfenamide (BBS), N,N-dicyclohexyl-2-benzothiazolylsulfenamide (DCBS) and dibenzothiazyl disulfide (MBTS), in combination with diphenylguanidine (DPG). Note that a compound (I) is not included in the vulcanization accelerator.

The ratio of sulfur and a vulcanization accelerator is not particularly limited; however, the mass ratio of sulfur/vulcanization accelerator preferably falls within the range of 2/1 to 1/2. Furthermore, EV vulcanization, which is a method for improving heat resistance of a rubber member mainly containing a natural rubber and which controls the ratio of sulfur to a vulcanization accelerator to be 1 or less, is preferably employed in uses where improvement of heat resistance is particularly required.

The modified carbon black of the present invention and granules of the modified carbon black may be blended and kneaded in the step (B); however it is preferable to blend and knead them in step (A). As the mixing ratio of them during kneading, more specifically the blend ratio of a modified carbon black relative to a rubber component (100 parts by weight), preferably falls within the range of 0.1 to 10 parts by weight and more preferably 0.4 to 3 parts by weight.

It is preferable that the kneading temperature when a modified carbon black or granules of the modified carbon black are kneaded in the step (A), more specifically, the temperature of a kneaded product at the time of completion of kneading, generally fall within the range of 140° C. to 200° C. and it is more preferable that the temperature fall within the range of 120° C. to 180° C. The kneading process in the step (A) is generally accompanied by heat generation. If the temperature of a kneaded product at the time of completion of kneading is 140° C. or more, the reaction of a modified carbon black, a rubber component and a filler tends to satisfactorily proceed. If the temperature of a kneaded product is 180° C. or less, deterioration and gelatinization of the rubber component tend to be suppressed and the viscoelasticity of the vulcanized rubber finally obtained tends to be improved.

It is preferable that the kneading temperature when a modified carbon black is kneaded in the step (B), more specifically, the temperature of a kneaded product at the time of completion of kneading, generally fall within the range of 60° C. to 120° C.

The kneading time preferably falls within the range of 1 to 10 minutes and more preferably 2 to 7 minutes. If the kneading time is one minute or more, dispersion of a filler in a rubber component tends to be satisfactory. If the kneading time is 10 minutes or less, deterioration and gelatinization of a rubber component tend to be suppressed and the viscoelasticity of a vulcanized rubber finally obtained tends to be improved.

It is also possible to blend and knead an agent for improving viscoelasticity conventionally used in the field of rubber. Examples of such an agent may include the compounds described in International Publication No. WO 2010/140704.

Of them, N,N'-bis(2-methyl-2-nitropropyl)-1,6-hexanediamine ("Sumifine (registered trademark) 1162", manufactured by Sumitomo Chemical Co., Ltd.), 5-nitroso-8-hydroxyquinoline (NQ-58), bis(3-triethoxysilylpropyl) tetrasulfide ("Si-69", manufactured by Degussa), bis(3-triethoxysilylpropyl)disulfide ("Si-75", manufactured by Degussa), 1,6-bis(N,N'-dibenzylthiocarbamoyldithio)-hexane ("KA9188", manufactured by Bayer), disodium hexamethylenebisthiosulfate, 2 hydrates, 1,3-biscitraconimidemethylbenzene ("Perkalink 900", manufactured by Flexsys) and an alkylphenol-sulfur chloride condensate such as "Tackirol (registered trademark) AP, V-200" manufactured by Taoka Chemical Co, Ltd., are preferable. The amount of these agents for improving viscoelasticity used preferably falls within the range of 0.1 to 10 parts by weight relative to a rubber component (100 parts by weight).

It is also preferable to blend and knead zinc oxide or stearic acid. The amount of zinc oxide used relative to a rubber component (100 parts by weight) preferably falls within the range of 1 to 15 parts by weight and more preferably falls within the range of 3 to 8 parts by weight. The amount of stearic acid used relative to a rubber component (100 parts by weight) preferably falls within the range of 0.5 to 10 parts by weight and more preferably falls within the range of 1 to 5 parts by weight.

When zinc oxide is blended, it is preferable to blend it in the step (A). When a vulcanization accelerator is blended, it is preferable to blend it in the step (B).

It is also possible to blend and knead various types of compounding agents conventionally used in the field of rubber. Examples of such compounding agents may include an antioxidant; an oil; fatty acids such as stearic acid; coumarone indene resins such as Coumarone resin NG4 (softening point: 81 to 100° C.) manufactured by Nittetsu Kagaku and Process resin AC5 (softening point: 75° C.) manufactured by KOBE OIL CHEMICAL INDUSTRIAL Co., Ltd.; terpene resins such as a terpene resin, a terpene phenolic resin and a modified aromatic terpene resin; rhodine derivatives such as "Nikanol (registered trademark) A70" (softening point: 70 to 90° C.) manufactured by Mitsubishi Gas Chemical Company, Inc.; hydrogenated rhodine derivatives; Novolak alkylphenol resins; resole alkylphenol resins; C5 petroleum resins; and liquid polybutadienes. These compounding agents may be blended in either one of the step (A) and step (B).

Examples of the oil mentioned above may include a process oil and a vegetable fat and oil. Examples of the process oil may include a paraffin process oil, a naphthenic process oil and an aromatic process oil.

Examples of the antioxidant mentioned above may include those described in "Rubber Industry Handbook <4th edition>" edited by the Society of Rubber Industry, Japan, pages 436 to 443. Of them, reaction products (TMDQ) of N-phenyl-N'-1,3-dimethylbutyl-p-phenylene diamine (6PPD), aniline and acetone, poly(2,2,4-trimethyl-1,2-)dihydroquinoline) ("antioxidant FR", manufactured by Matsubara Sangyo), a synthetic wax (e.g., paraffin wax), and a vegetable wax are preferably used.

It is also possible to blend and knead a vulcanizing agent such as morpholine disulfide conventionally used in the field of rubber. It is preferable to blend these in the step (B).

Furthermore, a peptizer and a retarder may be blended and kneaded and moreover, as necessary, various types of rubber chemicals and softeners or the like generally used may be blended and kneaded.

Examples of the retarder may include phthalic anhydride, benzoic acid, salicylic acid, N-nitrosodiphenylamine, N-(cyclohexylthio)-phthalimide (CTP), a sulfonamide derivative, diphenyl urea and bis(tridecyl)pentaerythritol-diphosphate; and N-(cyclohexylthio)-phthalimide (CTP) is preferably used.

The retarder may be blended and kneaded in the step (A) and preferably blended and kneaded in the step (B).

The amount of such a retarder used is not particularly limited; however, the amount used preferably falls within the range of 0.01 to 1 part by weight relative to a rubber component (100 parts by weight) and particularly preferably 0.05 to 0.5 parts by weight.

Next, step (C) of subjecting a kneaded product obtained in the step (B) to a heat treatment will be described.

The temperature of the heat treatment preferably falls within the range of 120 to 180° C. The heat treatment is generally performed at normal pressure or under pressure.

A method for producing a vulcanized rubber generally includes a step of processing a kneaded product obtained in step (B) in a predetermined state before subjecting it to the heat treatment in the step (C). The vulcanized rubber of the present invention includes a vulcanized rubber obtained by subjecting such a kneaded product processed in a predetermined state to the heat treatment in the (C).

Herein, the "step of processing the kneaded product obtained in the step (B) in a predetermined state" refers to, for example, in the field of tire, a "step of coating a steel cord with the kneaded product", a "step of coating a carcass fiber cord with the kneaded product" and a "step of processing the kneaded product into the shape of a tread member". Members such as a belt, a carcass, an inner liner, a side wall and tread (cap tread or under tread) separately obtained by these steps are generally, further formed into the shape of tire together with other members by a method generally employed in the field of tire, in other words, subjected to a step of installing the kneaded product into a tire to obtain a green tire containing the kneaded product, which is then subjected to the heat treatment in step (C). Such a heat treatment is generally performed under pressure. The vulcanized rubber of the present invention includes a vulcanized rubber constituting the above respective members of a tire thus obtained.

As the rubber component of a rubber composition preferable for tread members suitably used for large tires for vehicles such as a truck, a bus, a light truck and a construction vehicle, a natural rubber alone or a blend of SBR and/or BR containing a natural rubber as a main component and a natural rubber is preferable. As the filler, carbon black alone or a blend of silica and carbon black containing silica as a main component is preferably used. Furthermore, it is preferable to use a viscoelasticity improver, in combination, such as N,N'-bis(2-methyl-2-nitropropyl)-1,6-hexanediamine ("Sumifine (registered trademark) 1162", manufactured by Sumitomo Chemical Co., Ltd.), 5-nitroso-8-hydroxyquinoline (NQ-58), bis(3-triethoxysilylpropyl) tetrasulfide (Si-69), bis(3-triethoxysilylpropyl)disulfide (Si-75), 1,6-bis(N,N'-dibenzylthiocarbamoyldithio)-hexane ("KA9188", manufactured by Bayer), disodium hexamethylenebisthiosulfate, 2 hydrates, 1,3-biscitraconimide methylbenzene ("Perkalink 900", manufactured by Flexsys) and an alkylphenol-sulfur chloride condensate such as "Tackirol (registered trademark) AP, V-200" manufactured by Taoka Chemical Co, Ltd.

As a rubber component of a rubber composition preferable for a tread member suitably for use in automobile tires, a solution-polymerized SBR having a molecule terminal modified with a silicon compound alone or a blend of at least one rubber selected from the group consisting of a non-modified solution-polymerized SBR, emulsion-polymerized SBR, natural rubber and BR and the terminal-modified solution-polymerized SBR (containing the terminal-modified solution-polymerized SBR as a main component) is preferable. As the filler, a blend of silica and carbon black (containing silica as a main component) is preferably used. Furthermore, it is preferable to use an viscoelasticity improver, in combination, such as N,N'-bis(2-methyl-2-nitropropyl)-1,6-hexanediamine ("Sumifine (registered trademark) 1162", manufactured by Sumitomo Chemical Co., Ltd.), 5-nitroso-8-hydroxyquinoline (NQ-58), bis(3-triethoxysilylpropyl)tetrasulfide (Si-69), bis(3-triethoxysilylpropyl)disulfide (Si-75), 1,6-bis(N,N'-dibenzylthiocarbamoyldithio)-hexane ("KA9188", manufactured by Bayer), disodium hexamethylenebisthiosulfate, 2 hydrates, 1,3-biscitraconimide methylbenzene ("Perkalink 900", manufactured by Flexsys) and an alkylphenol-sulfur chloride condensate such as "Tackirol (registered trademark) AP, V-200" manufactured by Taoka Chemical Co, Ltd.

As a rubber component of a rubber composition preferable for a side wall member, a blend of at least one rubber selected from the group consisting of a non-modified solution-polymerized SBR, an emulsion-polymerized SBR and natural rubber and BR (containing BR as a main component) is preferable. Furthermore, as the filler, carbon black alone or a blend of silica and carbon black (containing carbon black as a main component) is preferably used. Furthermore, it is preferable to use a viscoelasticity improver, in combination, such as N,N'-bis(2-methyl-2-nitropropyl)-1,6-hexanediamine ("Sumifine (registered trademark) 1162", manufactured by Sumitomo Chemical Co., Ltd.), 5-nitroso-8-hydroxyquinoline (NQ-58), bis(3-triethoxysilylpropyl)tetrasulfide (Si-69), bis(3-triethoxysilylpropyl)disulfide (Si-75), 1,6-bis(N,N'-dibenzylthiocarbamoyldithio)-hexane ("KA9188", manufactured by Bayer), disodium hexamethylenebisthiosulfate, 2 hydrates, 1,3-biscitraconimide methylbenzene ("Perkalink 900", manufactured by Flexsys) and an alkylphenol-sulfur chloride condensate such as "Tackirol (registered trademark) AP, V-200" manufactured by Taoka Chemical Co, Ltd.

As a rubber component of a rubber composition preferable for a carcass and a belt member, a natural rubber alone or a blend of BR and a natural rubber (containing a natural rubber as a main component) is preferable. Furthermore, as the filler, carbon black alone or a blend of silica and carbon black (containing carbon black as a main component) is preferably used. Furthermore, it is preferable to use a viscoelasticity improver, in combination, such as N,N'-bis (2-methyl-2-nitropropyl)-1,6-hexanediamine ("Sumifine (registered trademark) 1162", manufactured by Sumitomo Chemical Co., Ltd.), 5-nitroso-8-hydroxyquinoline (NQ-58), bis(3-triethoxysilylpropyl)tetrasulfide (Si-69), bis(3-triethoxysilylpropyl)disulfide (Si-75), 1,6-bis(N,N'-dibenzyl-thiocarbamoyldithio)-hexane ("KA9188", manufactured by Bayer), disodium hexamethylenebisthiosulfate, 2 hydrates, 1,3-biscitraconimide methylbenzene ("Perkalink 900", manufactured by Flexsys) and an alkylphenol-sulfur chloride condensate such as "Tackirol (registered trademark) AP, V-200" manufactured by Taoka Chemical Co, Ltd.

Fuel efficiency of automobiles having a tire containing the vulcanized rubber of the present invention installed therein is improved and low fuel consumption can be attained. Furthermore, the vulcanized rubber can be not only used in the tires but also used as antivibration rubber for automobile parts such as an engine mount, strut mount, bush and exhaust hanger. Such antivibration rubber for automobile parts is generally obtained by processing a kneaded product obtained in the step (B) into each shape of the antivibration rubber parts for automobiles and then subjecting it to the heat treatment of the step (C).

EXAMPLES

The present invention will be more specifically described below by way of Examples. In the Examples, "parts" and "%" mean values on a weight basis, unless otherwise specified.

In the following Examples, measurement of physical properties was performed by the following methods.
<Element Analysis>
Sulfur-element content: ion chromatographic apparatus, DX-AQ-1120, manufactured by Nippon Dionex K.K.
Nitrogen-element content: NCH quantitative analyzer, SUMIGRAPH NCH-22F, manufactured by Sumika Chemical Analysis Service, Ltd.
<Viscoelasticity>
Viscoelasticity was measured using a viscoelasticity analyzer manufactured by Ueshima Seisakusho Co., Ltd.
Conditions: temperature of −5° C. to 80° C. (temperature raising rate: 2° C./minute)
Initial strain: 10%, dynamic strain: 2.5%, frequency: 10 Hz The content of a compound represented by formula (I) or formula (II) relative to carbon black (100 parts) was calculated in accordance with the following expression (III).

Content=100×{(A−B)÷C}÷{100−(A−B)÷C}    Expression (III)

wherein
A: nitrogen-element content (%) in a modified carbon black
B: nitrogen-element content (%) in an unmodified carbon black
C: weight fraction of a nitrogen atom in a compound represented by formula (I) or formula (II).

Production Example 1

Production of Compound (I)

A reaction container purged with nitrogen was charged with 3-chloropropylamine hydrochloride (100 parts (0.77 mol)), water (180 ml) and sodium thiosulfate pentahydrate (200.4 parts (0.81 mol)). The obtained mixture was stirred for 5 hours in a warm bath of 70 to 80° C. The reaction mixture was allowed to cool overnight. Crystal was obtained by filtration and then washed with water and methanol. The obtained crystal was dried at 50° C. for 4 hours to obtain a compound (a) represented by the following formula. Weight fraction of a nitrogen atom: 0.082, $^1$H-NMR (270.05 MHz, $D_2O$) $\delta_{ppm}$: 3.0-3.1 (4H, m), 2.0-2.1 (2H, m).

(a)

Production Example 2

Production of Compound (II)

Under a nitrogen atmosphere, a reaction container was charged with 1,4-phenylene diamine (211.3 g (1.95 mol)) and tetrahydrofuran (3900 ml). To this, a solution containing maleic anhydride (127.2 g (1.30 mol)) dissolved in tetrahydrofuran (600 ml) was added dropwise over about 3.3 hours under ice cooling. The mixture was then stirred at room temperature overnight. After completion of the reaction, a precipitated crystal was obtained by filtration, washed twice with tetrahydrofuran (280 ml) to obtain a yellow-orange powder. To the obtained yellow-orange powder (259.2 g), water (520 ml) was added. The mixture was cooled to 0 to 10° C. To this, a 5N aqueous sodium hydroxide solution (237 ml) and subsequently a 1N aqueous sodium hydroxide solution (6.5 ml) were added dropwise. Thereafter, the solvent was distilled off under reduced pressure. To the resultant residue, 2-propanol (200 ml) was added and again the solvent was distilled off under reduced pressure. To the obtained yellow-brown solid matter, tetrahydrofuran (800 ml) was added. The mixture was stirred at room temperature overnight and a solid matter was obtained by filtration and washed four times with tetrahydrofuran (100 ml) and dried at 45° C. for 5 hours to obtain a compound (b) represented by the following formula. The weight fraction of a nitrogen atom: 0.106, $H^1$-NMR (270 MHz, DMSO-d6) $\delta_{ppm}$: 14.6 (1H, s), 7.3 (2H, d, J=8.9 Hz), 6.5 (2H, d, J=8.9 Hz), 6.1 (1H, d, J=13.5 Hz), 5.6 (1H, d, J=13.5 Hz), 4.8 (2H, s), 3.3 (4H, s).

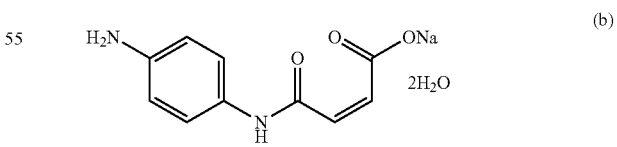

(b)

Example 1

Production of Modified Carbon Black (1)

A three-neck egg-plant flask was provided with a stirrer, a thermometer and a reflux condenser tube, and the inside of the flask was purged with nitrogen. To the flask, water (278 parts), HAF (trade name: "Asahi #70", manufactured by Asahi Carbon Co., Ltd., nitrogen-element content: 0.1%, sulfur-element content: 0.4%) (100 parts) and the compound (a) (1.1 parts) obtained in Production Example 1 were added and stirred. The obtained mixture was heated at 50° C. and stirred for one hour. The obtained mixture was cooled to room temperature and a solid substance was obtained by filtration and the obtained solid substance was dried at 50° C. under reduced pressure to obtain modified carbon black (1). The element analysis results of modified carbon black (1) are shown below.

Sulfur-element content: 0.6%
Nitrogen-element content: 0.15%
Content of compound (a) relative to carbon black (100 parts): 0.61 parts Example 2

Production of Modified Carbon Black (2)

A three-neck egg-plant flask was provided with a stirrer, a thermometer and a reflux condenser tube, and the inside of the flask was purged with nitrogen. To the flask, water (278 parts), HAF (trade name: "Asahi #70", manufactured by Asahi Carbon Co., Ltd., nitrogen-element content: 0.1%, sulfur-element content: 0.4%) (100 parts) and the compound (a) (1.1 parts) obtained in Production Example 1 were added and stirred. The obtained mixture was heated at 100° C. and stirred for one hour. The obtained mixture was cooled to room temperature. A solid substance was obtained by filtration and the obtained solid substance was dried at 50° C. under reduced pressure to obtain modified carbon black (2). The element analysis results of modified carbon black (2) are shown below.

Sulfur-element content: 0.6%
Nitrogen-element content: 0.18%
Content of compound (a) relative to carbon black (100 parts): 1.0 part Example 3

Production of Modified Carbon Black (3)

A separable flask was provided with a stirrer, a thermometer and a reflux condenser tube, and the inside of the flask was purged with nitrogen. To the flask, HAF (trade name: "Asahi #70", manufactured by Asahi Carbon Co., Ltd., nitrogen-element content: 0.1%, sulfur-element content: 0.4%) (100 parts) and the compound (a) (2.2 parts) obtained in Production Example 1 were added and stirred at 160° C. for 30 minutes. The obtained mixture was cooled to room temperature to obtain modified carbon black (3). The element analysis results of modified carbon black (3) are shown below.

Sulfur-element content: 0.9%
Nitrogen-element content: 0.25%
Content of compound (a) relative to carbon black (100 parts): 1.9 parts Example 4

Production of Modified Carbon Black (4)

To HAF (trade name: "Asahi #70", manufactured by Asahi Carbon Co., Ltd., nitrogen-element content: 0.1%, sulfur-element content: 0.4%) (100 parts), a solution, which was prepared by dissolving the compound (a) (2.2 parts) obtained in Production Example 1 in water (11 parts) at room temperature, was sprayed by means of a spray and heated at 200° C. for 30 minutes. The obtained mixture was cooled to room temperature to obtain modified carbon black (4). As a result of element analysis, the whole amount of starting compound (a) was contained in modified carbon black (4).

Example 5

Production of Modified Carbon Black (5)

Modified carbon black (5) was obtained in the same manner as in Example 4 except that a compound (b) was used in place of the compound (a). As a result of element analysis, the whole amount of starting compound (b) was contained in modified carbon black (5).

Example 6

Production of Modified Carbon Black (6)

Modified carbon black (6) was obtained in the same manner as in Example 1 except that a compound (b) was used in place of the compound (a).

Example 7

Production of Modified Carbon Black (7)

Modified carbon black (7) was obtained in the same manner as in Example 2 except that a compound (b) was used in place of the compound (a).

Example 8

Production of Modified Carbon Black (8)

Modified carbon black (8) was obtained in the same manner as in Example 3 except that a compound (b) was used in place of the compound (a).

Reference Example 1

Production of Rubber Composition

<Procedure 1>
Using a Banbury mixer (600 ml labo-plastomill, manufactured by TOYO SEIKI KOGYO Co., Ltd.), natural rubber (RSS#1) (100 parts), HAF (trade name: "Asahi #70", manufactured by Asahi Carbon Co., Ltd.) (45 parts), stearic acid (3 parts), zinc oxide (5 parts) and an antioxidant (N-phenyl-N'-1,3-dimethylbutyl-p-phenylene diamine: trade name: "Antigen (registered trademark) 6C", manufactured by Sumitomo Chemical Co., Ltd.) (1 part) were blended and kneaded to obtain a rubber composition. In Procedure 1, the components were supplied and kneaded by a mixer at a rotation number of 50 rpm for 5 minutes. The rubber temperature at this time was 160 to 170° C.
<Procedure 2>
The rubber composition obtained in accordance with Procedure 1, a vulcanization accelerator (N-cyclohexyl-2-benzothiazolylsulfenamide) (1 part) and sulfur (2 parts) were blended and kneaded by use of an open roller at a temperature of 60 to 80° C. to obtain a rubber composition.

Reference Example 2

Production of Vulcanized Rubber

The rubber composition obtained in accordance with Procedure 2 of Reference Example 1 was subjected to a vulcanization treatment at 145° C. to obtain a vulcanized rubber.

Example 9

Production of Rubber Composition

A rubber composition was obtained in the same manner as in Reference Example 1 except that the modified carbon black (45.5 parts) obtained in Example 1 was used in place of HAF (trade name: "Asahi #70", manufactured by Asahi Carbon Co., Ltd.) (45 parts) in Reference Example 1.

Example 10

Production of Vulcanized Rubber

The rubber composition obtained in Example 9 was subjected to a vulcanization treatment at 145° C. to obtain a vulcanized rubber.

Example 11

Production of Rubber Composition

A rubber composition was obtained in the same manner as in Reference Example 1 except that the modified carbon black (45.5 parts) obtained in Example 2 was used in place of HAF (trade name: "Asahi #70", manufactured by Asahi Carbon Co., Ltd.) (45 parts) in Reference Example 1.

Example 12

Production of Vulcanized Rubber

The rubber composition obtained in Example 11 was subjected to a vulcanization treatment at 145° C. to obtain a vulcanized rubber.

Example 13

Production of Rubber Composition

A rubber composition was obtained in the same manner as in Reference Example 1 except that the modified carbon black (46 parts) obtained in Example 3 was used in place of HAF (trade name: "Asahi #70", manufactured by Asahi Carbon Co., Ltd.) (45 parts) in Reference Example 1.

Example 14

Production of Vulcanized Rubber

The rubber composition obtained in Example 13 was subjected to a vulcanization treatment at 145° C. to obtain a vulcanized rubber.

Example 15

Production of Rubber Composition

A rubber composition was obtained in the same manner as in Reference Example 1 except that the modified carbon black (46 parts) obtained in Example 4 was used in place of HAF (trade name: "Asahi #70", manufactured by Asahi Carbon Co., Ltd.) (45 parts) in Reference Example 1.

Example 16

Production of Vulcanized Rubber

The rubber composition obtained in Example 15 was subjected to a vulcanization treatment at 145° C. to obtain a vulcanized rubber.

Example 17

Production of Rubber Composition

A rubber composition was obtained in the same manner as in Reference Example 1 except that the modified carbon black (46 parts) obtained in Example 5 was used in place of HAF (trade name: "Asahi #70", manufactured by Asahi Carbon Co., Ltd.) (45 parts) in Reference Example 1.

Example 18

Production of Vulcanized Rubber

The rubber composition obtained in Example 17 was subjected to a vulcanization treatment at 145° C. to obtain a vulcanized rubber.

Example 19

Production of Rubber Composition

A rubber composition was obtained in the same manner as in Reference Example 1 except that the modified carbon black (45.5 parts) obtained in Example 6 was used in place of HAF (trade name: "Asahi #70", manufactured by Asahi Carbon Co., Ltd.) (45 parts) in Reference Example 1.

Example 20

Production of Vulcanized Rubber

The rubber composition obtained in Example 19 was subjected to a vulcanization treatment at 145° C. to obtain a vulcanized rubber.

Example 21

Production of Rubber Composition

A rubber composition was obtained in the same manner as in Reference Example 1 except that the modified carbon black (45.5 parts) obtained in Example 7 was used in place of HAF (trade name: "Asahi #70", manufactured by Asahi Carbon Co., Ltd.) (45 parts) in Reference Example 1.

Example 22

Production of Vulcanized Rubber

The rubber composition obtained in Example 21 was subjected to a vulcanization treatment at 145° C. to obtain a vulcanized rubber.

Example 23

Production of Rubber Composition

A rubber composition was obtained in the same manner as in Reference Example 1 except that the modified carbon black (46 parts) obtained in Example 8 was used in place of HAF (trade name: "Asahi #70", manufactured by Asahi Carbon Co., Ltd.) (45 parts) in Reference Example 1.

Example 24

Production of Vulcanized Rubber

The rubber composition obtained in Example 23 was subjected to a vulcanization treatment at 145° C. to obtain a vulcanized rubber.

Comparative Example 1

Production of Rubber Composition

A rubber composition was obtained in the same manner as in Reference Example 1 except that natural rubber (RSS#1) (100 parts), HAF (trade name: "Asahi #70", manufactured by Asahi Carbon Co., Ltd.) (45 parts), stearic acid (3 parts), zinc oxide (5 parts), an antioxidant (N-phenyl-N'-1,3-dimethylbutyl-p-phenylenediamine: trade name: "Antigen (registered trademark) 6C" manufactured by Sumitomo Chemical Co., Ltd.) (1 part) and the compound (a) (0.5 parts) obtained in Production Example 1 were blended and kneaded in Procedure 1 of Reference Example 1.

Comparative Example 2

Production of Vulcanized Rubber

The rubber composition obtained in Comparative Example 1 was subjected to a vulcanization treatment at 145° C. to obtain a vulcanized rubber.

Comparative Example 3

Production of Rubber Composition

A rubber composition was obtained in the same manner as in Comparative Example 1 except that the amount of compound (a) obtained in Production Example 1 used was changed from 0.5 parts to 1 part in Comparative Example 1.

Comparative Example 4

Production of Vulcanized Rubber

The rubber composition obtained in Comparative Example 3 was subjected to a vulcanization treatment at 145° C. to obtain a vulcanized rubber.

Vulcanized rubbers obtained in Reference Example 2, Examples 10, 12, 14, 16 and 18, Comparative Example 2 and Comparative Example 4 were measured for viscoelasticity (tan δ at 60° C.) and decreasing rates of viscoelasticity based on the vulcanized rubber obtained in Reference Example 2 were obtained. The results are shown in Table 1. Furthermore, vulcanized rubbers obtained in Examples 20, 22 and 24 can be measured for viscoelasticity (tan δ at 60° C.). The vulcanized rubbers containing the modified carbon black of the present invention were improved in viscoelasticity compared to vulcanized rubbers containing non-modified general carbon black.

Decreasing rate (%)=(viscoelasticity of vulcanized rubber obtained in Reference Example 1−viscoelasticity of vulcanized rubber obtained in Examples or Comparative Examples)/viscoelasticity of vulcanized rubber obtained in Reference Example 2×100.

TABLE 1

| | Compound (a) | | Compound (b) | | De- |
|---|---|---|---|---|---|
| | Amount charged*1 | Content*2 | Amount charged*1 | Content*2 | creasing rate (%) |
| Example 10 | 1.1 parts | 0.6 parts | | | 19 |
| Example 12 | 1.1 parts | 1.0 part | | | 16 |
| Comparative Example 2 | 1.1 parts | — | | | 15 |
| Example 14 | 2.2 parts | 1.9 parts | | | 25 |
| Example 16 | 2.2 parts | whole amount | | | 30 |
| Comparative Example 4 | 2.2 parts | — | | | 17 |
| Example 18 | | | 2.2 parts | whole amount | 17 |

*1Amount charged relative to carbon black (100 parts)
*2Content relative to carbon black (100 parts)

Example 25

A belt is obtained by coating a brass-plated steel cord with the rubber composition obtained in Example 9. A green tire is formed by using the resultant belt in accordance with a general production method and the resultant green tire is heated under pressure in a vulcanizer to obtain a vulcanized tire.

Example 26

The rubber composition obtained in Example 9 is processed by extrusion to obtain a tread member. A green tire is formed by using the resultant tread member in accordance with a general production method and the resultant green tire is heated under pressure in a vulcanizer to obtain a vulcanized tire.

Example 27

The rubber composition obtained in Example 9 is processed by extrusion to prepare a rubber composition having a shape corresponding to the shape of carcass. A carcass is obtained by bonding onto the top and bottom of a carcass fiber cord made of polyester. A green tire is formed by using the resultant carcass in accordance with a general production method and the resultant green tire is heated under pressure in a vulcanizer to obtain a vulcanized tire.

Examples 28 to 30

Vulcanized tires are obtained in the same manner as in Examples 25 to 27 except that the rubber composition obtained in Example 11 is used in place of the rubber composition obtained in Example 9, in Examples 25 to 27.

Examples 31 to 33

Vulcanized tires are obtained in the same manner as in Examples 25 to 27 except that the rubber composition obtained in Example 13 is used in place of the rubber composition obtained in Example 9, in Examples 25 to 27.

Examples 34 to 36

Vulcanized tires are obtained in the same manner as in Examples 25 to 27 except that the rubber composition obtained in Example 15 is used in place of the rubber composition obtained in Example 9, in Examples 25 to 27.

Examples 37 to 39

Vulcanized tires are obtained in the same manner as in Examples 25 to 27 except that the rubber composition obtained in Example 17 is used in place of the rubber composition obtained in Example 9, in Examples 25 to 27.

Examples 40 to 42

Vulcanized tires are obtained in the same manner as in Examples 25 to 27 except that the rubber composition obtained in Example 19 is used in place of the rubber composition obtained in Example 9, in Examples 25 to 27.

Examples 43 to 45

Vulcanized tires are obtained in the same manner as in Examples 25 to 27 except that the rubber composition obtained in Example 21 is used in place of the rubber composition obtained in Example 9, in Examples 25 to 27.

Examples 46 to 48

Vulcanized tires are obtained in the same manner as in Examples 25 to 27 except that the rubber composition obtained in Example 23 is used in place of the rubber composition obtained in Example 9, in Examples 25 to 27.

INDUSTRIAL APPLICABILITY

The viscoelasticity of vulcanized rubber can be further improved by the modified carbon black according to the present invention.

The invention claimed is:

1. A modified carbon black comprising carbon black and at least one compound selected from the group consisting of a compound represented by formula (I) and a compound represented by formula (II), wherein a content of the at least one compound selected from the group consisting of a compound represented by formula (I) and a compound represented by formula (II) relative to 100 parts by weight of carbon black is 0.1 to 50 parts by weight:

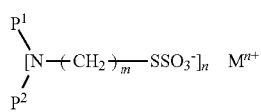

wherein $P^1$ and $P^2$ each independently represent a hydrogen atom or an alkyl group having 1 to 6 carbon atoms, or $P^1$ and $P^2$ are combined with each other to represent an alkanediyl group having 2 to 6 carbon atoms;
m represents an integer of 2 to 9;
$M^{n+}$ represents $H^+$ or an n-valent metal cation; and
n represents an integer of 1 to 3;

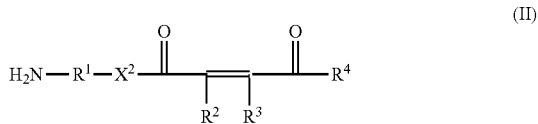

wherein $R^1$ represents an alkanediyl group having 1 to 12 carbon atoms and optionally having a substituent, a cycloalkanediyl group having 3 to 12 carbon atoms and optionally having a substituent, or a *—$B^1$—Ar—$B^2$—* group wherein * represents a bond,
$B^1$ represents a single bond or an alkanediyl group having 1 to 12 carbon atoms,
$B^2$ represents a single bond or an alkanediyl group having 1 to 12 carbon atoms, and
Ar represents a divalent aromatic hydrocarbon group having 6 to 12 carbon atoms and optionally having a substituent;
$R^2$ and $R^3$ each independently represent a hydrogen atom, a halogen atom, an alkyl group having 1 to 6 carbon atoms, an aryl group having 6 to 12 carbon atoms, a hydroxy group or an alkoxy group having 1 to 6 carbon atoms, or $R^2$ and $R^3$ are combined with each other to represent an alkanediyl group having 2 to 12 carbon atoms;
$R^4$ represents a hydroxy group, an alkoxy group having 1 to 6 carbon atoms, an aryloxy group having 6 to 12 carbon atoms, an arylalkoxy group having 7 to 15 carbon atoms, an amino group having 0 to 12 carbon atoms or —$O^-(Y^{n+})^{1/n}$ wherein $Y^{n+}$ represents an n-valent cation and n represents 1 or 2; and
$X^2$ represents —NH— or —O—.

2. The modified carbon black according to claim 1, wherein the at least one compound selected from the group consisting of a compound represented by formula (I) and a compound represented by formula (II) is a compound represented by formula (I), a nitrogen-element content is 0.01 to 10 wt %, and a sulfur-element content is 0.04 to 13.5 wt %.

3. The modified carbon black according to claim 1, obtained by mixing carbon black and at least one compound selected from the group consisting of a compound represented by formula (I) and a compound represented by formula (II).

4. The modified carbon black according to claim 1, obtained by mixing carbon black and at least one compound selected from the group consisting of a compound represented by formula (I) and a compound represented by formula (II) in the presence of a solvent and taking out a solid substance from the obtained mixture.

5. The modified carbon black according to claim 4, wherein the solvent is water.

6. The modified carbon black according to claim 1, wherein the at least one compound selected from the group consisting of a compound represented by formula (I) and a compound represented by formula (II) is a compound represented by formula (I-1):

7. The modified carbon black according to claim 1, wherein the modified carbon black is in a granular form.

8. The modified carbon black according to claim 1, obtained by mixing carbon black and an aqueous solution of at least one compound selected from the group consisting of a compound represented by formula (I) and a compound represented by formula (II), and granulating followed by drying.

9. The modified carbon black according to claim 1, obtained by mixing carbon black and water, granulating, thereafter adding an aqueous solution of at least one compound selected from the group consisting of a compound represented by formula (I) and a compound represented by formula (II) and drying.

10. A method for producing a modified carbon black comprising mixing carbon black and at least one compound selected from the group consisting of a compound represented by formula (I) and a compound represented by formula (II):

wherein $P^1$ and $P^2$ each independently represent a hydrogen atom or an alkyl group having 1 to 6 carbon atoms, or $P^1$ and $P^2$ are combined with each other to represent an alkanediyl group having 2 to 6 carbon atoms;
m represents an integer of 2 to 9;
$M^{n+}$ represents $H^+$ or an n-valent metal cation; and
n represents an integer of 1 to 3;

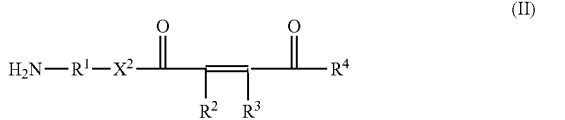

wherein $R^1$ represents an alkanediyl group having 1 to 12 carbon atoms and optionally having a substituent, a cycloalkanediyl group having 3 to 12 carbon atoms and optionally having a substituent, or a $*-B^1-Ar-B^2-*$ group wherein * represents a bond,
$B^1$ represents a single bond or an alkanediyl group having 1 to 12 carbon atoms,
$B^2$ represents a single bond or an alkanediyl group having 1 to 12 carbon atoms, and
Ar represents a divalent aromatic hydrocarbon group having 6 to 12 carbon atoms and optionally having a substituent;
$R^2$ and $R^3$ each independently represent a hydrogen atom, a halogen atom, an alkyl group having 1 to 6 carbon atoms, an aryl group having 6 to 12 carbon atoms, a hydroxy group or an alkoxy group having 1 to 6 carbon atoms, or $R^2$ and $R^3$ are combined with each other to represent an alkanediyl group having 2 to 12 carbon atoms;
$R^4$ represents a hydroxy group, an alkoxy group having 1 to 6 carbon atoms, an aryloxy group having 6 to 12 carbon atoms, an arylalkoxy group having 7 to 15 carbon atoms, an amino group having 0 to 12 carbon atoms or $-O^-(Y^{n+})^{1/n}$ wherein $Y^{n+}$ represents an n-valent cation and n represents 1 or 2; and
$X^2$ represents —NH— or —O—.

11. The method for producing a modified carbon black according to claim 10, comprising mixing carbon black and at least one compound selected from the group consisting of a compound represented by formula (I) and a compound represented by formula (II) in the presence of a solvent and taking out a solid substance from the obtained mixture.

12. The method for producing a modified carbon black according to claim 11, wherein the solvent is water.

13. The method for producing a modified carbon black according to claim 10, comprising mixing carbon black and an aqueous solution of at least one compound selected from the group consisting of a compound represented by formula (I) and a compound represented by formula (II), and granulating followed by drying.

14. The method for producing a modified carbon black according to claim 10, comprising mixing carbon black and water, granulating, thereafter adding an aqueous solution of at least one compound selected from the group consisting of a compound represented by formula (I) and a compound represented by formula (II) and drying.

* * * * *